(12) United States Patent
Shen

(10) Patent No.: US 12,563,530 B2
(45) Date of Patent: Feb. 24, 2026

(54) RESOURCE CONFIGURATION METHOD AND APPARATUS, DEVICE, AND STORAGE MEDIUM

(71) Applicant: GUANGDONG OPPO MOBILE TELECOMMUNICATIONS CORP., LTD., Dongguan (CN)

(72) Inventor: Jia Shen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 586 days.

(21) Appl. No.: 17/961,964

(22) Filed: Oct. 7, 2022

(65) Prior Publication Data

US 2023/0038071 A1 Feb. 9, 2023

Related U.S. Application Data

(63) Continuation of application No. PCT/CN2020/084306, filed on Apr. 10, 2020.

(51) Int. Cl.
*H04W 72/02* (2009.01)
*H04W 72/044* (2023.01)
(Continued)

(52) U.S. Cl.
CPC ......... *H04W 72/02* (2013.01); *H04W 72/044* (2013.01); *H04W 72/23* (2023.01); *H04W 80/02* (2013.01)

(58) Field of Classification Search
CPC ...... G06N 3/0464; G06N 3/098; G06V 10/95; H04W 72/02; H04W 72/044; H04W 72/23; H04W 80/02
See application file for complete search history.

(56) References Cited

U.S. PATENT DOCUMENTS

| | | | |
|---|---|---|---|
| 8,254,393 B2 * | 8/2012 | Horvitz | H04L 41/0896 370/348 |
| 8,547,860 B2 * | 10/2013 | Zhang | H04L 5/0064 370/252 |

(Continued)

FOREIGN PATENT DOCUMENTS

| | | |
|---|---|---|
| CN | 107734543 A | 2/2018 |
| CN | 108347776 A | 7/2018 |

(Continued)

OTHER PUBLICATIONS

Extended European Search Report dated May 10, 2023 received in European Patent Application No. EP20930151.4.

(Continued)

*Primary Examiner* — Eric Nowlin
(74) *Attorney, Agent, or Firm* — Sheppard, Mullin, Richter & Hampton LLP

(57) ABSTRACT

The present disclosure relates to communication technology, and provides a resource configuration method and apparatus, a device, and a storage medium. The method includes: receiving first resource configuration information from a network device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration. The combined configuration solution according to the embodiments of the present disclosure can reduce the number of times the network device performs resource scheduling, and reduce the processing overhead of the network device.

18 Claims, 15 Drawing Sheets

(51) Int. Cl.
    *H04W 72/23*     (2023.01)
    *H04W 80/02*     (2009.01)

(56)         References Cited

U.S. PATENT DOCUMENTS

| | | | | |
|---|---|---|---|---|
| 9,319,206 | B2 * | 4/2016 | Arnott | H04W 72/0446 |
| 10,805,931 | B2 * | 10/2020 | Cho | H04W 28/16 |
| 10,958,325 | B1 * | 3/2021 | Park | H04W 88/02 |
| 11,006,432 | B2 * | 5/2021 | Vivanco | H04W 72/23 |
| 11,114,093 | B2 * | 9/2021 | Kim | H04W 72/1268 |
| 11,397,893 | B2 * | 7/2022 | Wang | G06N 3/08 |
| 11,689,940 | B2 * | 6/2023 | Wang | H04W 24/02 |
| | | | | 706/25 |
| 11,700,595 | B2 * | 7/2023 | Kusashima | H04L 5/0037 |
| | | | | 370/336 |
| 11,886,991 | B2 * | 1/2024 | Wang | H04L 12/189 |
| 11,928,587 | B2 * | 3/2024 | Wang | G06N 3/045 |
| 12,001,943 | B2 * | 6/2024 | Wang | H04W 24/02 |
| 12,008,462 | B2 * | 6/2024 | Zhang | G06N 3/082 |
| 12,236,347 | B2 * | 2/2025 | Wang | G06N 3/08 |
| 2009/0003201 | A1 * | 1/2009 | Horvitz | H04L 41/147 |
| | | | | 370/229 |
| 2010/0202393 | A1 * | 8/2010 | Zhang | H04L 5/0037 |
| | | | | 370/329 |
| 2017/0064031 | A1 * | 3/2017 | Sunay | H04W 28/18 |
| 2017/0359754 | A1 * | 12/2017 | Yousefi'zadeh | G06N 3/084 |
| 2019/0042884 | A1 | 2/2019 | Guim Bernat et al. | |
| 2019/0268894 | A1 * | 8/2019 | Cho | H04W 28/16 |
| 2019/0385600 | A1 * | 12/2019 | Kim | H04W 72/1268 |
| 2020/0104184 | A1 * | 4/2020 | Subramanian | G06F 9/5044 |
| 2020/0178093 | A1 * | 6/2020 | Peng | H04W 36/00838 |
| 2020/0195495 | A1 * | 6/2020 | Parker | H04L 41/40 |
| 2021/0045131 | A1 * | 2/2021 | Vivanco | H04W 16/02 |
| 2021/0049451 | A1 * | 2/2021 | Wang | H04W 24/02 |
| 2021/0064996 | A1 * | 3/2021 | Wang | H04L 1/0016 |
| 2021/0158151 | A1 * | 5/2021 | Wang | H04W 4/06 |
| 2021/0182658 | A1 * | 6/2021 | Wang | G06N 3/045 |
| 2021/0295174 | A1 * | 9/2021 | Zhang | G06N 3/082 |
| 2021/0319286 | A1 * | 10/2021 | Gunduz | H04N 19/30 |
| 2021/0342687 | A1 * | 11/2021 | Wang | G06N 3/08 |
| 2021/0351863 | A1 * | 11/2021 | Gunduz | H03M 13/6312 |
| 2022/0376865 | A1 * | 11/2022 | Gao | H04L 5/22 |
| 2022/0377610 | A1 * | 11/2022 | Garcia | H04L 5/0062 |
| 2023/0004864 | A1 * | 1/2023 | Wang | G06N 20/00 |
| 2023/0042545 | A1 * | 2/2023 | Palaios | H04W 28/0268 |
| 2023/0066178 | A1 * | 3/2023 | Ouyang | G06F 9/44505 |
| 2023/0104220 | A1 * | 4/2023 | Sandberg | G06N 7/01 |
| | | | | 370/329 |
| 2023/0328704 | A1 * | 10/2023 | Oh | H04W 72/232 |
| | | | | 370/329 |
| 2024/0135175 | A1 * | 4/2024 | Wang | H04L 41/16 |

FOREIGN PATENT DOCUMENTS

| | | | | |
|---|---|---|---|---|
| CN | 109474980 A | * | 3/2019 | G06N 3/0454 |
| CN | 109615022 A | | 4/2019 | |
| CN | 109937596 A | | 6/2019 | |
| CN | 110767220 A | | 2/2020 | |
| CN | 109474980 B | * | 4/2020 | G01N 3/0454 |
| CN | 109769257 B | * | 9/2021 | |
| CN | 116018865 A | * | 4/2023 | H04L 5/0094 |
| CN | 110678843 B | * | 7/2023 | G06F 1/3206 |
| EP | 4171145 A1 | * | 4/2023 | H04L 5/0094 |
| WO | 2019047156 A1 | | 3/2019 | |
| WO | WO-2020033898 A1 | * | 2/2020 | G06F 18/2148 |
| WO | WO-2022154141 A1 | * | 7/2022 | |
| WO | WO-2024030216 A1 | * | 2/2024 | H04L 5/14 |
| WO | WO-2024113836 A1 | * | 6/2024 | G06F 9/4843 |

OTHER PUBLICATIONS

Chen Mingzhe et al:"Performance Optimization of Federated Learning overWireless Networks",2019 IEEE Global Communications Conference(GLOBECOM), IEEE, Dec. 9, 2019 (Dec. 9, 2019),pp. 1-6, XP033722000.

Shen Xuemin et al:"AI-Assisted Network-Slicing Based Next-Generation Wireless Networks" IEEE Open Journal of Vehicular Technology,IEEE vol. 1, Jan. 8, 2020 (Jan. 8, 2020), pp. 45-66,XP011769825.

International Search Report and Written Opinion dated Dec. 30, 2020 in International Application No. PCT/CN2020/084306. English translation attached.

Communication pursuant to Article 94(3) EPC of counterpart European application No. 20930151.4 issued on Aug. 27, 2025.

3GPP TS 36.321 V16.0.0 (Mar. 2020), 3rd Generation Partnership Project; Technical Specification Group Radio Access Network; Evolved Universal Terrestrial Radio Access (E-UTRA); Medium Access Control (MAC) protocol specification (Release 16), 36321-g00, Apr. 8, 2020, entire document.

* cited by examiner

Splitting AI Operation In 5G System    Downloading Of AI Model In 5G System  Training Of AI Model In 5G System

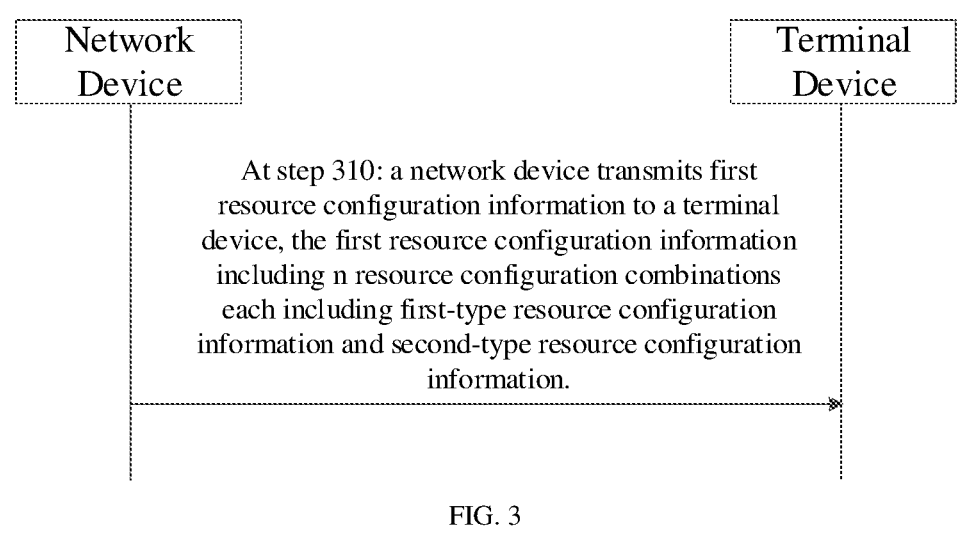

| Network Device | | Terminal Device |
|---|---|---|

At step 310: a network device transmits first resource configuration information to a terminal device, the first resource configuration information including n resource configuration combinations each including first-type resource configuration information and second-type resource configuration information.

FIG. 3

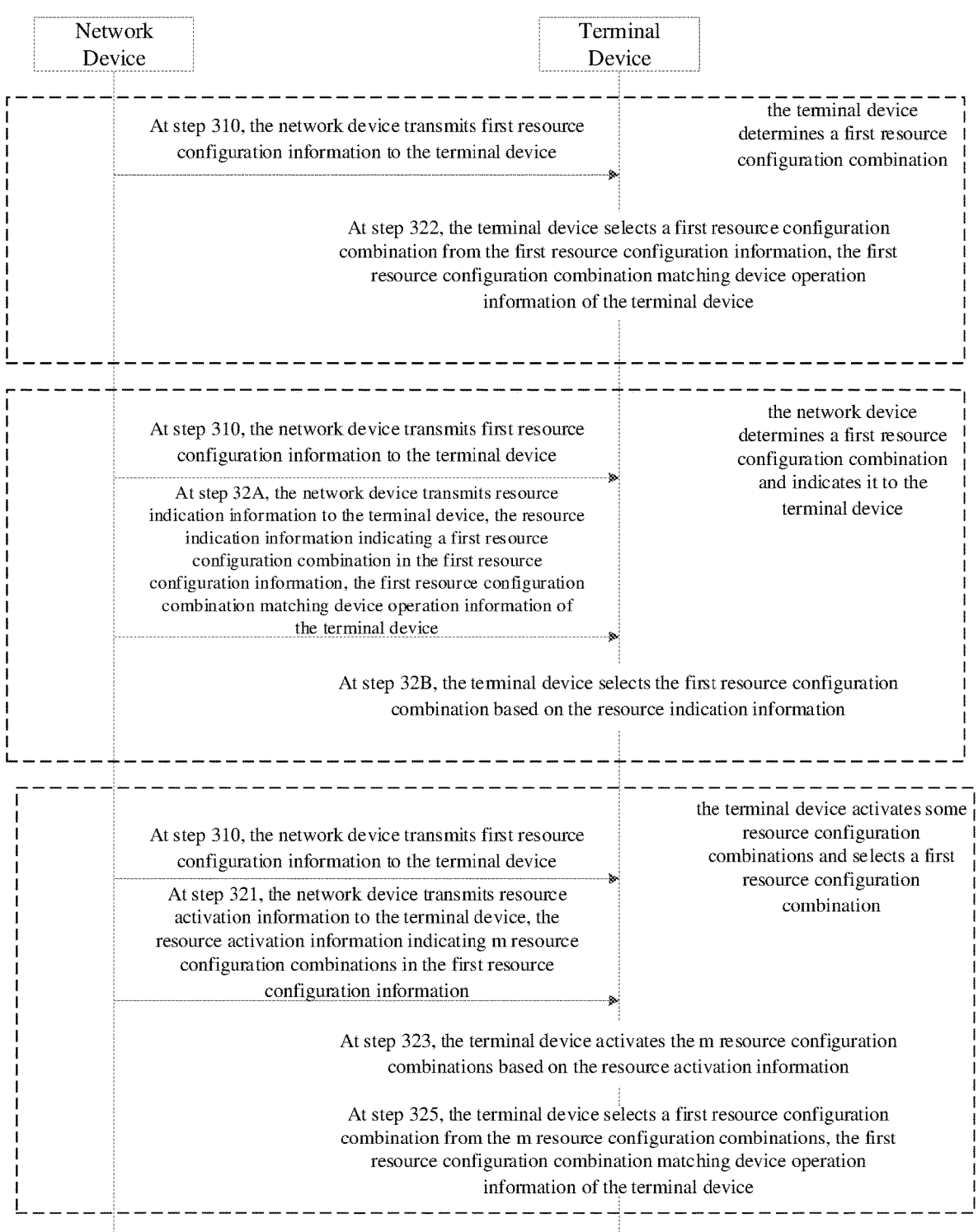

At step 310, the network device transmits first resource configuration information to the terminal device the terminal device determines a first resource configuration combination At step 322, the terminal device selects a first resource configuration combination from the first resource configuration information, the first resource configuration combination matching device operation information of the terminal device At step 310, the network device transmits first resource configuration information to the terminal device the network device determines a first resource configuration combination and indicates it to the terminal device At step 32A, the network device transmits resource indication information to the terminal device, the resource indication information indicating a first resource configuration combination in the first resource configuration information, the first resource configuration combination matching device operation information of the terminal device At step 32B, the terminal device selects the first resource configuration combination based on the resource indication information At step 310, the network device transmits first resource configuration information to the terminal device the terminal device activates some resource configuration combinations and selects a first resource configuration combination At step 321, the network device transmits resource activation information to the terminal device, the resource activation information indicating m resource configuration combinations in the first resource configuration information At step 323, the terminal device activates the m resource configuration combinations based on the resource activation information At step 325, the terminal device selects a first resource configuration combination from the m resource configuration combinations, the first resource configuration combination matching device operation information of the terminal device

FIG. 4

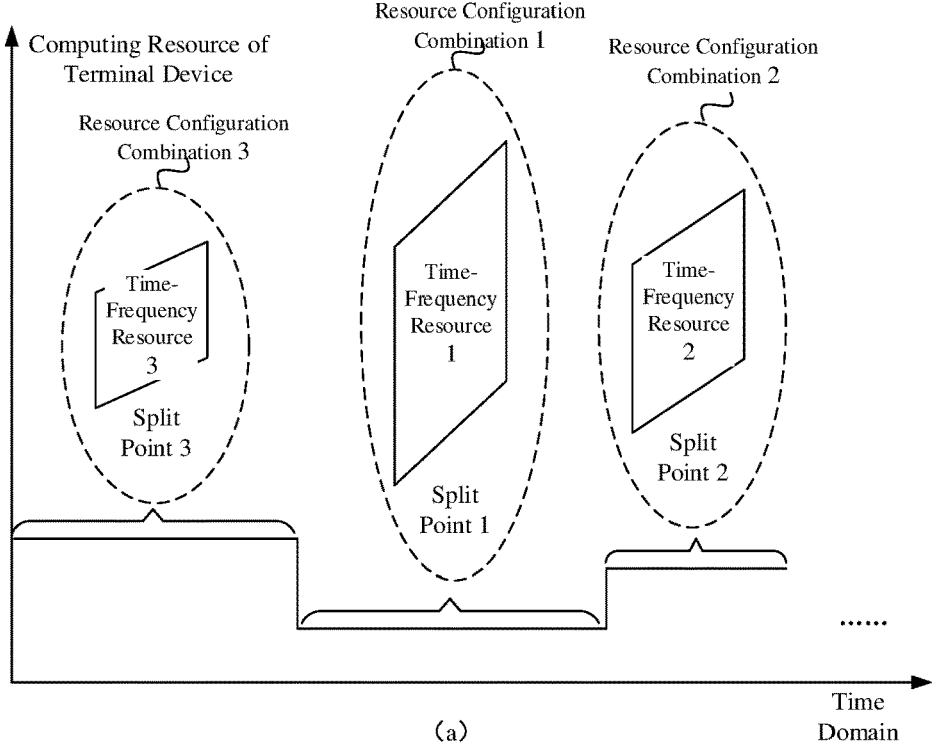
(a)
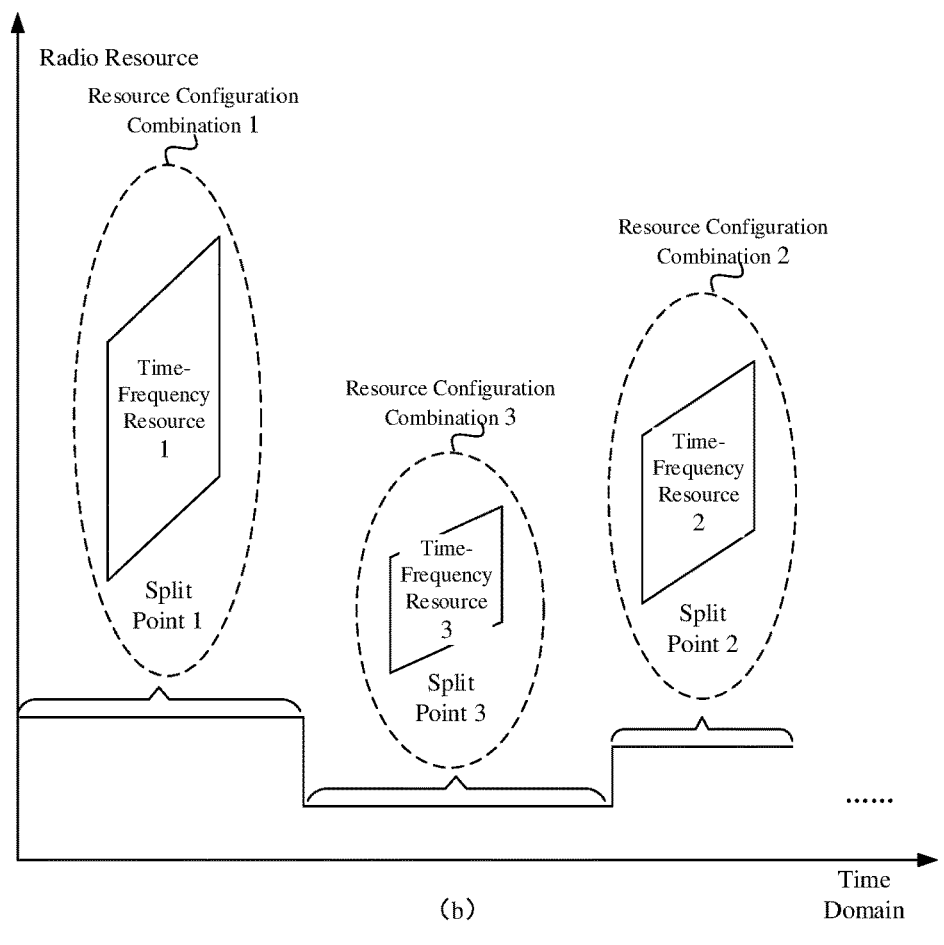
(b)
FIG. 8

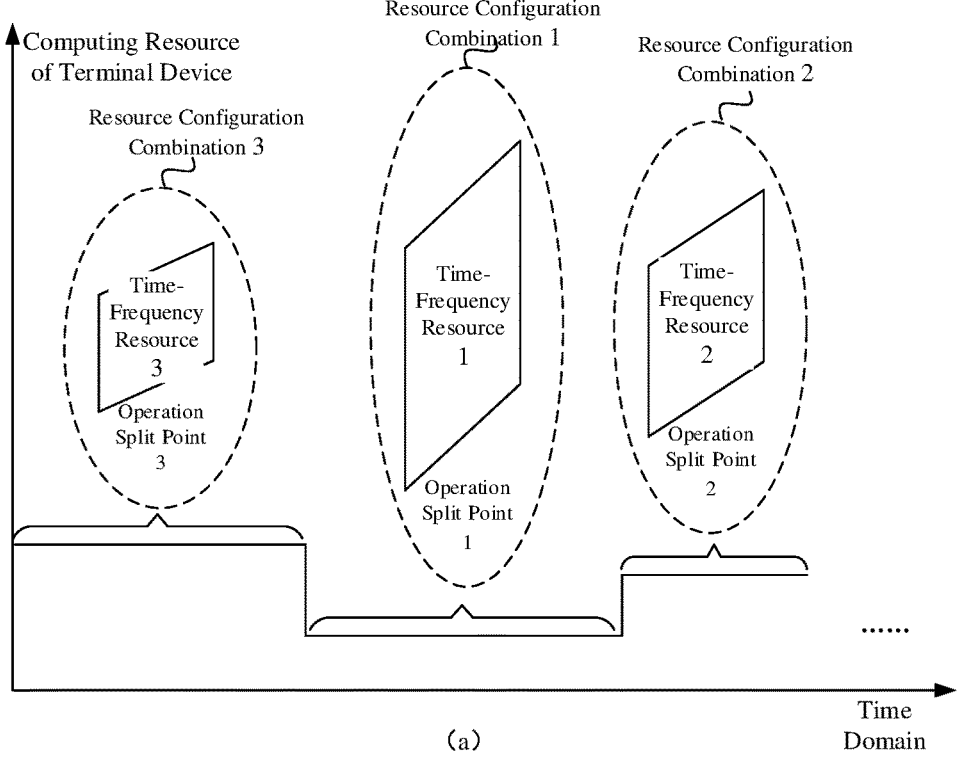
(a)
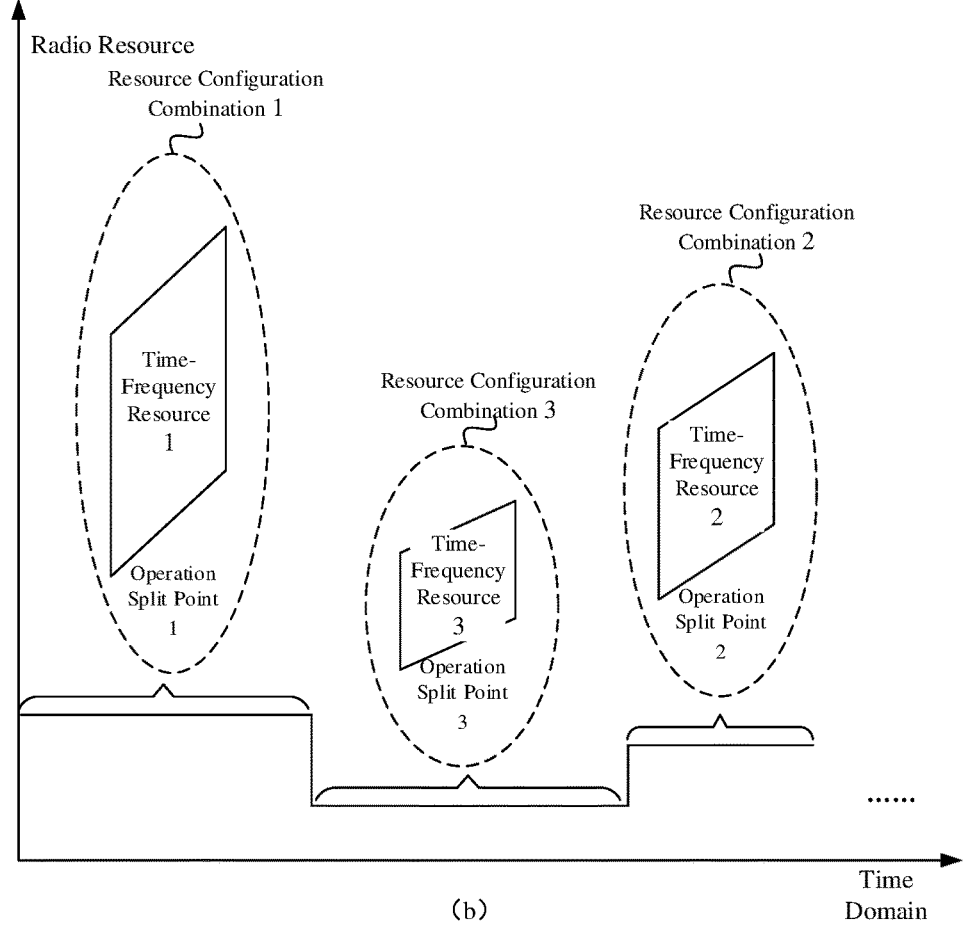
(b)
FIG. 11

(a)

(b)

1700

Configuration Information
Receiving Module     1710

Terminal Device 210

Network Device 220

RESOURCE CONFIGURATION METHOD AND APPARATUS, DEVICE, AND STORAGE MEDIUM

CROSS-REFERENCE TO RELATED APPLICATION

The present application is a continuation of International Application No. PCT/CN2020/084306, filed on Apr. 10, 2020, which is hereby incorporated by reference in its entirety.

TECHNICAL FIELD

The embodiments of the present disclosure relate to communication technology, and more particularly, to a resource configuration method and apparatus, a device, and a storage medium.

BACKGROUND

Artificial Intelligence (AI) is taking on more and more important tasks in mobile communication terminals, such as photography, image recognition, video call, Augmented Reality (AR)/Virtual Reality (VR), gaming, etc.

The $3^{rd}$ Generation Partnership Project (3GPP) proposes three major application scenarios for combined application of the $5^{th}$ Generation (5G) mobile networks or mobile communication technology and AI: splitting AI operation in 5G system, downloading of AI model in 5G system, and training of AI model in 5G system. Here, "splitting AI operation" means that a terminal device completes a part of AI operation that is delay-sensitive, privacy-sensitive and less computationally intensive, reports intermediate data to a network device, and the network device completes the remaining part that is delay-insensitive, privacy-insensitive, and more computationally intensive. "Downloading of AI model" means that when a terminal device is in a mobile environment, facing different AI tasks and experiencing different AI operation environments, it needs to use different AI models, and if the terminal device does not have a required model, it needs to download a new model from a network device to use. "Training of AI model" means that during a model training process, a global model for training needs to be allocated to a terminal device from a network device, and then the terminal device reports trained local gradients to the network device, and then the network device merges the local models of the terminal device to form a more optimized global model.

The above three application scenarios all need to use radio resources of the network device to transmit AI resources. For example, the terminal device needs to upload the intermediate data in "splitting AI operation in 5G system", download the AI model in "downloading of AI model in 5G system", and download the global model and upload the gradients in "training of AI/ML model in 5G system". Therefore, for the above three application scenarios, how to configure radio resources and AI resources to ensure proper transmission of AI resources by the terminal device requires further discussion and research.

SUMMARY

The embodiments of the present disclosure provide a resource configuration method and apparatus, a device, and a storage medium. The technical solutions are as follows.

In an aspect, an embodiment of the present disclosure provides a resource configuration method. The method is applied in a terminal device and includes: receiving first resource configuration information from a network device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In another aspect, an embodiment of the present disclosure provides a resource configuration method. The method is applied in a network device and includes: transmitting first resource configuration information to a terminal device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In yet another aspect, an embodiment of the present disclosure provides a resource configuration apparatus. The apparatus is applied in a terminal device and includes: a configuration information receiving module configured to receive first resource configuration information from a network device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In still another aspect, an embodiment of the present disclosure provides a resource configuration apparatus. The apparatus is applied in a network device and includes: a configuration information transmitting module configured to transmit first resource configuration information to a terminal device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In still yet another aspect, an embodiment of the present disclosure provides a terminal device. The terminal device includes a processor and a transceiver connected to the processor. The transceiver is configured to receive first resource configuration information from a network device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In still yet another aspect, an embodiment of the present disclosure provides a network device. The network device includes a processor and a transceiver connected to the processor. The transceiver is configured to transmit first resource configuration information to a terminal device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In still yet another aspect, an embodiment of the present disclosure provides a computer-readable storage medium. The computer-readable storage medium has a computer program stored therein. The computer program, when executed by a processor of a terminal device, implements the above resource configuration method at the terminal device.

In still yet another aspect, an embodiment of the present disclosure provides a computer-readable storage medium. The computer-readable storage medium has a computer program stored therein. The computer program, when executed by a processor of a network device, implements the above resource configuration method at the network device.

In still yet another aspect, an embodiment of the present disclosure provides a chip. The chip includes a programmable logic circuit and/or program instructions. The chip is configured to, when running on a terminal device, implement the above resource configuration method at the terminal device.

In still yet another aspect, an embodiment of the present disclosure provides a chip. The chip includes a programmable logic circuit and/or program instructions. The chip is configured to, when running on a network device, implement the above resource configuration method at the network device.

The technical solutions according to the embodiments of the present disclosure can provide the following advantageous effects.

The resource configuration information is transmitted to the terminal device by the network device. The resource configuration information includes multiple resource configuration combinations each including multiple types of resource configuration information, thereby providing a method for configuring multiple resource combinations. In addition, the embodiments of the present disclosure configure multiple types of resources in combination, such that the network device can schedule the multiple types of resources by performing one resource scheduling. When compared with the solution in which multiple times of resource scheduling are required for scheduling multiple types of resources separately, the solution of combined configuration according to the embodiments of the present disclosure can reduce the number of times the network device performs resource scheduling, reduce the processing overhead of the network device, and save data transmission resources.

In addition, in the embodiments of the present disclosure, each resource configuration combination may include two types of resource configuration information: one type of resource configuration information indicating the radio resource configuration, and the other type of resource configuration information indicating the AI resource configuration, so as to achieve combined configuration of the radio resource and the AI resource. When compared with a case where the radio resource and the AI resource are configured separately which may lead to the problem that the radio resource and the AI resource does not match each other, the embodiments of the present disclosure configure the radio resource and the AI resource that match each other together to form a resource configuration combination, which ensures both the adequacy of the radio resource and the quality of the AI service, thereby improving the utilization of the radio resource, and avoiding waste of radio resource or insufficient radio resource for data interaction when they are configured separately. It also improves the reliability of the AI service and avoids waste of the AI resource or insufficient AI resource for AI operations in the case of separate configurations.

BRIEF DESCRIPTION OF DRAWINGS

In order to describe the technical solutions in the embodiments of the present disclosure more clearly, the drawings to be used in the description of the embodiments will be briefly introduced below. Obviously, the drawings in the following description are only some embodiments of the present disclosure, and other drawings can be obtained by those of ordinary skill in the art based on these drawings without any inventive efforts.

FIG. 3 is a flowchart illustrating a resource configuration method according to an embodiment of the present disclosure;

FIG. 4 is a flowchart illustrating a resource configuration method according to another embodiment of the present disclosure;

FIG. 8 is a schematic diagram showing a resource configuration method corresponding to FIG. 7;

FIG. 11 is a schematic diagram showing a resource configuration method corresponding to FIG. 10;

DESCRIPTION OF EMBODIMENTS

The embodiments of the present disclosure will be further described in detail below with reference to the accompanying drawings, such that the objects, technical solutions, and advantages of the present disclosure will become more apparent.

The network architecture and service scenarios described in the embodiments of the present disclosure are intended to illustrate the technical solutions of the embodiments of the present disclosure more clearly, and do not constitute any limitation on the technical solutions according to the embodiments of the present disclosure. It can be appreciated by those of ordinary skill in the art that with the evolution of the network architecture and the emergence of new service scenarios, the technical solutions according to the embodiments of the present disclosure will be equally applicable to similar technical problems.

Figures 1, 2:
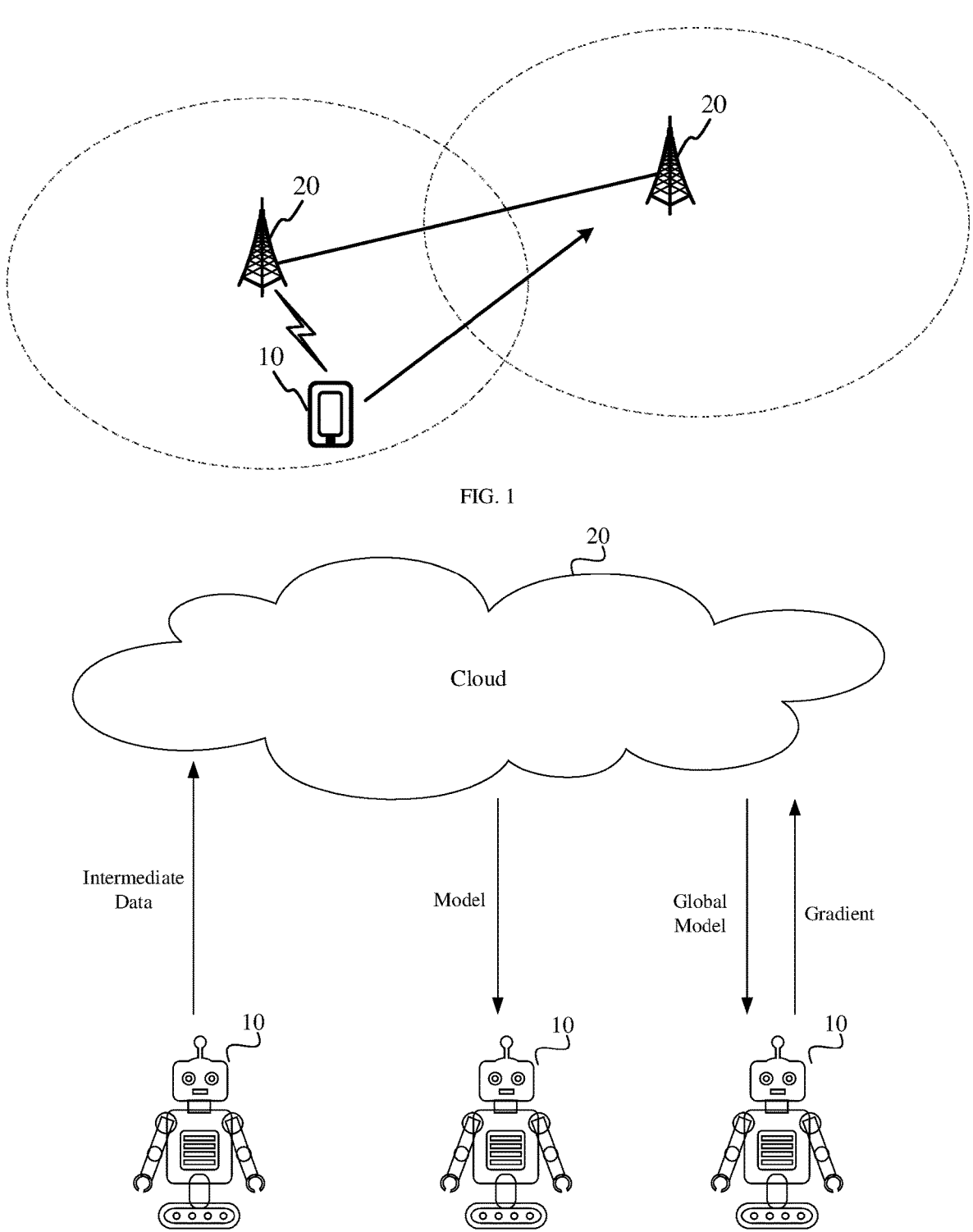
FIG. 1 is a schematic diagram showing a network architecture according to an embodiment of the present disclosure.
FIG. 2 is a schematic diagram showing a combination of an AI service and a 5G service according to an embodiment of the present disclosure.

Referring to FIG. 1, which is a schematic diagram showing a network architecture according to an embodiment of the present disclosure, the network architecture may include: a terminal device 10 and a network device 20.

A number of terminal devices 10 are typically provided, and one or more terminal devices 10 may be distributed in a cell managed by each network device 20. The terminal device 10 may include various devices with wireless communication functions, such as handheld devices, in-vehicle devices, wearable devices, computing devices or other processing devices connected to wireless modems, as well as various forms of User Equipments (UEs), Mobile Stations (MSs) and so on. For convenience of description, in the embodiments of the present disclosure, the devices mentioned above are collectively referred to as terminal devices.

The network device 20 is a device deployed in an access network to provide a wireless communication function for the terminal device 10. The network device 20 may include various forms of macro base stations, micro base stations, relay stations, access points, and the like. In systems using different radio access technologies, the names of devices with network device functions may be different. For example, in 5G NR systems, they are referred to as gNodeBs or gNBs. As communications technology evolves, the name "network device" may change. For convenience of description, in the embodiments of the present disclosure, the above-mentioned devices for providing a wireless communication function for the terminal device 10 are collectively referred to as network devices.

The "5G NR system" in the embodiments of the present disclosure may also be referred to as a 5G system or an NR system, but those skilled in the art can understand its meaning. The technical solutions described in the embodiments of the present disclosure may be applicable to the 5G NR system, and may also be applicable to the subsequent evolved system of the 5G NR system.

At present, AI is taking on more and more important tasks in mobile communication terminals, such as photography, image recognition, video calls, Augmented Reality (AR)/Virtual Reality (VR), gaming, etc.

AI is a theory, method, technology, and application system that uses digital computers or machines controlled by digital computers to simulate, extend, and expand human intelligence, perceive an environment, acquire knowledge and use the knowledge to obtain the best results. That is, AI is to study the design principles and implementation methods of various intelligent machines, such that the machines can have the functions of perception, inference and decision-making. The AI technology is a comprehensive discipline, involving a wide range of fields, including both hardware-level technologies and software-level technologies. The basic AI technologies generally include sensors, dedicated artificial intelligence chips, cloud computing, distributed storage, big data processing technology, operation/interactive systems, mechatronics and the like. The AI software technologies mainly include aspects such as Computer Vision (CV), Speech Technology, Nature Language Processing (NLP) and Machine Learning (ML)/deep learning.

The 3GPP proposes three application scenarios for the combined application of 5G and AI: splitting AI operation in 5G system, downloading of AI model in 5G system, and training of AI model in 5G system.

First of all, "splitting AI operation in 5G system" will be introduced.

The traditional method of "offloading AI inference operation to cloud" needs to rely on extremely low "sensing-inference-control" end-to-end round-trip delay, and millisecond (ms) level round-trip delay not only requires the terminal device and the network device to support Ultra Reliable Low Latency Communications (URLLC), but also requires ubiquitous deployment of Mobile Edge Computing (MEC), which will be extremely challenging in future 5G network deployments. A delay of 99.9999% requires full network coverage, which cannot be achieved in the 5G mmWave frequency band. In addition, "offloading AI operation" may also bring privacy protection risks. Uploading local data of many terminal devices to the network device may violate privacy protection regulations and users' intentions. Therefore, local AI operations at terminal devices are necessary. A feasible method is that the terminal device cooperates with the network device to complete the AI inference operations, i.e., "splitting AI operation in 5G system". That is, the terminal device completes a part of AI operation that is delay-sensitive, privacy-sensitive and less computationally intensive, reports intermediate data to a network device, and the network device completes the remaining part that is delay-insensitive, privacy-insensitive, and more computationally intensive.

Next, "downloading of AI model in 5G system" will be introduced.

For the traditional method of "performing AI inference operation on terminal device", due to the limited computing power and battery resource of the terminal device, only low-complexity AI models can be executed on the terminal device, but low-complexity AI models have low "generalization capabilities", and thus can only be applied to specific application scenarios and operation environments. When the terminal device is in a mobile environment, facing different AI tasks and experiencing different AI operation environments, different AI models need to be used. If the terminal does not have a required model, it needs to download a new model from the network device to use.

Finally, "training of AI model in 5G system" will be introduced.

In order to use valuable "small sample data" collected by the terminal device to train an AI model and protect the data privacy of the user corresponding to the terminal device, it is necessary to use Distributed Learning and Federated Learning based on the mobile communication network. In the training process, a global model for training needs to be allocated to the terminal device through the mobile communication network, and then local gradients trained by the terminal device are reported to the network device, and then the local models of the terminal device are merged by the network device to form a more optimized global model.

For the above three application scenarios, it is needed to use radio resources of the network device to transmit AI resources. As shown in FIG. 2, in "splitting AI operation in 5G system", the terminal device 10 needs to upload the intermediate data to the cloud 20. In "downloading of AI model in 5G system", the terminal device 10 needs to download the AI model from the cloud 20. In "training of AI model in 5G system", the terminal device 10 needs to download the global model from the cloud 20 and upload the gradients to the cloud 20. In one example, since "splitting AI operation in 5G system" adopts static splitting, that is, "which part is calculated by the terminal device and which part is calculated by the network device" is fixed, and "downloading of AI model in 5G system" is to select the AI model to be downloaded according to the needs of the AI inference task, in addition, "training of AI model in 5G system" is to determine the training parameters according to the needs of the AI training task, such as the magnitude of the training data set, and the frequency at which the local training results are reported, the terminal device can schedule AI resources independently. That is, the terminal device can schedule AI resources and radio resources separately.

However, since the terminal device is in a changing wireless channel environment and is constantly moving, there may be problems such as reduced transmission rate, data packet loss, and uncertain transmission delay. In addition, different terminal devices may have different chip processing resources and storage resources to be allocated for AI computing, and the chip processing resources and storage resources of the terminal devices may change at any time. In case of separate scheduling of AI resources and radio resources, there will be situations where the two cannot match each other. For example, in a certain resource allocation mode, the AI resources meet the requirements of the terminal device to use the AI model, but the radio resources do not meet the requirements of the terminal device for data interaction. Alternatively, the radio resources meet the requirements of the terminal device for data interaction, but the AI resources do not meet the requirements for the terminal device to use the AI model. Therefore, the separate scheduling of AI resources and radio resources may result in the degradation of AI service performance, and may waste AI resources or radio resources.

Based on the above, an embodiment of the present disclosure provides a resource configuration method. The resource configuration information is transmitted to the terminal device by the network device. The resource configuration information includes multiple resource configuration combinations. Each resource configuration combination may include two types of resource configuration information: one type of resource configuration information indicating the radio resource configuration, and the other type of resource configuration information indicating the AI resource configuration, so as to achieve combined configuration of the radio resource and the AI resource. When compared with a case where the radio resource and the AI resource are configured separately which may lead to the problem that the radio resource and the AI resource does not match each other, the embodiments of the present disclosure configure the radio resource and the AI resource that match each other together to form a resource configuration combination, which ensures both the adequacy of the radio resource and the quality of the AI service, thereby improving the utilization of the radio resource, and avoiding waste of radio resource or insufficient radio resource for data interaction when they are configured separately. It also improves the reliability of the AI service and avoids waste of the AI resource or insufficient AI resource for AI operations in the case of separate configurations.

In the following, the technical solutions of the present disclosure will be described with reference to a number of exemplary embodiments.

FIG. 3 is a flowchart illustrating a resource configuration method according to an embodiment of the present disclosure. The method may be applied in the network architecture shown in FIG. 1. The method may include the following steps.

At step 310, a network device transmits first resource configuration information to a terminal device. The first resource configuration information includes n resource configuration combinations each including first-type resource configuration information and second-type resource configuration information.

The first resource configuration information is combined information of resource configurations. That is, the first resource configuration information is configuration information that combines at least one resource configuration. In an embodiment of the present disclosure, the terminal device may receive the first resource configuration information from the network device, so as to use the first resource configuration information to perform subsequent data interaction, operation execution, and the like.

The embodiment of the present disclosure is not limit to any specific manner of determining the first resource configuration information. Optionally, the first resource configuration information may be determined by the network device. For example, after acquiring a service usage requirement of the terminal device, the network device determines the types of resources required to be configured for the terminal device, so as to further combine multiple types of resource configurations to form multiple resource configuration combinations, that is, to form the first resource configuration information. Alternatively, the first resource configuration information may be predetermined in a protocol. For example, for services requirements that the terminal device may have, the resource configuration for each service requirement may be predetermined in the protocol, and the resource configurations for multiple services requirements may be combined to specify the first resource configuration information including multiple resource configuration combinations.

The embodiment of the present disclosure is not limited to any transmission mode of the first resource configuration information. Optionally, the first resource configuration information may be carried in Radio Resource Control (RRC) configuration information, such that the terminal device can obtain the first configuration information when accessing the network device. Alternatively, the first resource configuration information may be carried in a system message, such that the terminal device can obtain the first configuration information from the system message broadcasted by the network device. Alternatively, the first resource configuration information may be carried in other high-level configuration information, e.g., Downlink Control Information (DCI), Media Access Control (MAC) Control Element (CE).

The first resource configuration information includes n resource configuration combinations, where n is a positive integer. The embodiment of the present disclosure is not limited to any specific number of resource configuration combinations included in the first resource configuration information, i.e., the embodiment of the present disclosure is not limited to any value of n. In practice, the value of n may be determined based on the number of types of resource configuration information in the resource configuration combination and the amount of resource configuration information for each type.

Each resource configuration combination may include multiple types of resource configuration information. Optionally, the multiple types of resource configuration information in each resource configuration combination have an association relationship and match each other. That is, in the embodiment of the present disclosure, the resource configuration information associated with each other can be configured in combination, and the resource configuration information matching each other can be combined to form a resource configuration combination. For example, in an embodiment of the present disclosure, the above radio resource and AI resource can be configured in combination, and the radio resource configuration information and AI resource configuration information that match each other can be combined together to form a resource configuration combination. The embodiment of the present disclosure is not limited to any form of matching between multiple types of resource configuration information. For example, the matching may be represented as multiple types of resource configuration information in each resource configuration combination all satisfying service requirements of the terminal device. For example, the radio resource configuration information and the AI resource configuration information matching each other may be represented as the radio resource configuration information in each resource configuration combination can meet the requirement of the terminal device for normal data interaction, and the AI resource configuration information in the resource configuration combination can meet the requirement of the terminal device to perform AI operations normally.

The embodiment of the present disclosure is not limited to any number or type of resource configuration information included in the resource configuration combination. In practical applications, the number and type of resource configuration information included in the resource configuration combination may be determined based on the number and type of service requirements of the terminal device. For the situation where the service requirements of the terminal device include "performing data interaction with network device" and "performing AI-related operations", the embodiment of the present disclosure proposes a resource configuration combination. The resource configuration combination includes two types of resource configuration information: a first-type resource configuration information and a second-type resource configuration information. The first-type resource configuration information indicates a radio resource configuration, such that the terminal device can use the radio resource configuration to perform data interaction with the network device. The second-type resource configuration information indicates an AI resource configuration, such that the terminal device can use the AI resource configuration to perform AI-related operations. For the introduction and description of the content included in the first-type resource configuration information and the second-type resource configuration information, reference can be made to the following method embodiments, and details thereof are omitted here.

To summarize, with the technical solutions according to the embodiments of the present disclosure, the resource configuration information is transmitted to the terminal device by the network device. The resource configuration information includes multiple resource configuration combinations each including multiple types of resource configuration information, thereby providing a method for configuring multiple resource combinations. In addition, the embodiments of the present disclosure configure multiple types of resources in combination, such that the network device can schedule the multiple types of resources by performing one resource scheduling. When compared with the solution in which multiple times of resource scheduling are required for scheduling multiple types of resources separately, the solution of combined configuration according to the embodiments of the present disclosure can reduce the number of times the network device performs resource scheduling, reduce the processing overhead of the network device, and save data transmission resources.

In addition, in the embodiments of the present disclosure, each resource configuration combination may include two types of resource configuration information: one type of resource configuration information indicating the radio resource configuration, and the other type of resource configuration information indicating the AI resource configuration, so as to achieve combined configuration of the radio resource and the AI resource. When compared with a case where the radio resource and the AI resource are configured separately which may lead to the problem that the radio resource and the AI resource does not match each other, the embodiments of the present disclosure configure the radio resource and the AI resource that match each other together to form a resource configuration combination, which ensures both the adequacy of the radio resource and the quality of the AI service, thereby improving the utilization of the radio resource, and avoiding waste of radio resource or insufficient radio resource for data interaction when they are configured separately. It also improves the reliability of the AI service and avoids waste of the AI resource or insufficient AI resource for AI operations in the case of separate configurations.

The contents included in the first-type resource configuration information and the second-type resource configuration information will be described below.

First, the content included in the first-type resource configuration information will be introduced and explained.

In an example, the first-type resource configuration information may include at least one of: time domain resource information, frequency domain resource information, space domain resource information, or code domain resource information.

In the same frequency range or at the same time, there may be multiple terminal devices that need to perform data interaction with the network device. In order to avoid data interaction conflicts between multiple terminal devices and the network device, a solution may be that the terminal devices use different time domain ranges or frequency domain ranges for data interaction with the network device. That is, each terminal can be configured with its available time domain range or frequency domain range, and the terminal device uses the configured time domain range or frequency domain range for data interaction to avoid conflicts. In the embodiment of the present disclosure, the time domain resource information indicates an available time domain range for the terminal device, and the frequency domain resource information indicates an available frequency domain range for the terminal device.

In addition, when the terminal device and the network device perform data interaction, there may be multiple pairs of candidate beams to choose from, but the reference signal quality corresponding to each pair of candidate beams may be different. Beam failure or data interaction failure can be avoided to a certain extent when a pair of beams matching the terminal device is used for data interaction. In the embodiment of the present disclosure, the spatial domain resource information, or referred to as space domain resource information, indicates available pairs of beams for the terminal device. In addition, since there may be multiple data for interactions between the terminal device and the network device, in order to distinguish different data and to reduce the amount of data for interaction, the data is often encoded. In the embodiment of the present disclosure, the code domain resource information indicates an available coding range for the terminal device.

It should be understood that the above exemplary embodiment only takes the first-type resource configuration information including time domain resource information, frequency domain resource information, space domain resource information and code domain resource information as an example for illustration. In alternative embodiments, the first-type resource configuration information may also include other information indicating a radio resource configuration, such as power resource information, etc., and the embodiment of the present disclosure is not limited to this.

Next, the content included in the second-type resource configuration information will be introduced and explained.

In an example, the second-type resource configuration information may include at least one of: model usage information, model execution information, model operation information, model download information, data usage information, data reporting information, or resource usage information.

The model usage information indicates an AI model used by the terminal device. For different AI tasks that the terminal device needs to perform, or different AI operation environments where the terminal device is located, the AI models used by the terminal device may be different. In order to identify the AI model that can be used by the terminal device from multiple AI models, the embodiment of the present disclosure proposes to include model usage information in the second-type resource configuration information, and the model usage information may indicate the AI model used by the terminal device. The embodiment of the present disclosure is not limited to any specific content of the model usage information. Optionally, the model usage information may include an identifier of the AI model used by the terminal device, e.g., a serial number of the AI model used by the terminal device.

The model execution information indicates a part of the model that the terminal device is responsible for executing in the AI model used by the terminal device. Due to the limited computing power and processing overhead of the terminal device, for the AI model used by the terminal device, the terminal device may only be responsible for executing a part of the AI model, and the remaining part of the AI model needs to be executed by the network device. In order to indicate to the terminal device the part of the model it needs to execute, the embodiment of the present disclosure proposes to include model execution information in the second-type resource configuration information, and the model execution information indicates that in the AI model used by the terminal device, the part of the model the terminal device is responsible for executing. The embodiment of the present disclosure is not limited to any way of splitting a certain AI model into parts to be executed by the terminal device and the network device, respectively. Optionally, for a certain AI model used by the terminal device, the parts to be executed by the terminal device and the network device respectively may be split according to the level of the AI model. For example, for an AI model including 4 sub-models, the first sub-model can be allocated to the terminal device for execution, and the second to fourth sub-models can be executed by the network device. The embodiment of the present disclosure is not limited to any specific content of the model execution information. Optionally, the model execution information may include information on model split points of the AI model used by the terminal device. For example, the AI model used by the terminal device can be split into four sub-models. Then there are 3 model split points of the AI model. If the part that the terminal device is responsible for executing is the first and second sub-models, then the model split point corresponding to the AI model included in the model execution information is 2.

The model operation information indicates a part of operation that the terminal device is responsible for executing in the AI model used by the terminal device. Due to the limited computing power and processing overhead of the terminal device, for the AI model used by the terminal device, the terminal device may only be responsible for executing a part of the operation corresponding to the AI model, and the remaining part of the operation corresponding to the AI model needs to be executed by the network device. That is, for the AI model used by the terminal device, the operation performed when executing the AI model can be split into two parts: one part is to be executed by the terminal device, and the other part is to be executed by the network device. In order to indicate to the terminal device the part of operation it needs to execute, the embodiment of the present disclosure proposes to include the model operation information in the second-type resource configuration information, and the model operation information indicates the part of operation that the terminal device is responsible for executing in the AI model used by the terminal device. The embodiment of the present disclosure is not limited to any way of splitting the operation into parts performed by the terminal device and the network device respectively in the AI model. Optionally, for a certain AI model used by the terminal device, the parts of operation the terminal device and the network device are responsible for executing respectively can be split based on the number of operations corresponding to the AI model. For example, for an AI model that includes 12 operations, the first four operations can be allocated to the terminal device for execution, and the last eight operations can be executed by the network device. The embodiment of the present disclosure is not limited to any specific content of the model operation information. Optionally, the model operation information may include information on operation split points of the AI model used by the terminal device. For example, the operations corresponding to the AI model used by the terminal device may include 12 operations. Then there are 11 operation split points corresponding to the AI model. If the part of operation the terminal device is responsible for is the 1st to 5th operations, then the operation split point corresponding to the AI model included in the model operation information is 5.

The model download information indicates an AI model downloaded by the terminal device. For different AI tasks that the terminal device needs to perform, or different AI operation environments where the terminal device is located, the AI models used by the terminal device may be different. Due to the limited storage resources of the terminal device, AI models are typically stored at the network device, so the terminal device needs to download different AI models from the network device for different AI tasks or different AI operation environments. In order to identify the AI model downloaded by the terminal device from multiple AI modules, the embodiment of the present disclosure proposes to include the model download information in the second-type resource configuration information, and the model download information may indicate the AI model downloaded by the terminal device. This embodiment of the present disclosure is not limited to any specific content of the model download information. Optionally, the model download information may include an identifier of the AI model downloaded by the terminal device, e.g., a serial number of the AI model downloaded by the terminal device.

The data usage information indicates training data used by the terminal device when training the AI model. Since the terminal device needs to use training samples to train the AI model, for different AI models, the terminal device needs to use different training samples to train the AI models. For example, for an image-processing-type of AI model, the terminal device needs to use image training samples to train the AI model. Moreover, for a specific AI model, different terminal devices can use different training samples to train the AI model due to different computing power and storage spaces. For example, for a terminal device with low computing power, the number of training samples that can be used to train the AI model may be small. In order to indicate to the terminal device the training samples used when training the AI model, the embodiment of the present disclosure proposes to include the data usage information in the second-type resource configuration information, and the data usage information may indicate the training data used by the terminal device when training the AI model. The embodiment of the present disclosure is not limited to any specific content of the data usage information. Optionally, the data usage information may include an amount of training data used by the terminal device when training the AI model, e.g., a number and/or type of training samples used by the terminal device when training the AI model.

The data reporting information indicates a frequency at which the terminal device reports a training result of the AI model. When the terminal device participates in distributed learning or federated learning, for training of an AI model, the terminal device needs to report the training result of the AI model to the network device. Due to the limitation of a certain amount of data in a single data transmission of the terminal device, if the training result is reported after all the training of the AI model has been completed, the training result may not be reported at one time. Moreover, since the terminal device participates in distributed learning or federated learning, it needs to report the training result to the network device in time for the model version it trains, to ensure that other training entity of the AI model can obtain the training result in time for subsequent training. Therefore, the terminal device needs to report the training result to the network device multiple times. In order to indicate to the terminal device the frequency at which the training result is reported, the embodiment of the present disclosure proposes to include the data reporting information in the second-type resource configuration information, and the data reporting information may indicate the frequency at which the terminal device reports the training result of the AI model. The embodiment of the present disclosure is not limited to any specific content of the data reporting information. Optionally, the data reporting information may include a reporting period for the terminal device to report the training result of the AI model. The embodiment of the present disclosure is not limited to any specific division method of the reporting period. Optionally, the reporting period may be divided by time, e.g., every 5 seconds may be set as the reporting period, or the reporting period may be divided by the number of training rounds, e.g., for example, every 3 training rounds may be set as the reporting period.

The resource usage information indicates an amount of resources used by the terminal device when performing an operation related to the AI model. Since the amount of available resources of the terminal device is different at different times, the amount of resources that can be invested in training the AI model or performing an AI task is also different. In order to indicate to the terminal device the amount of resources it can invest in the operation related to the AI model, the embodiment of the present disclosure proposes to include the resource usage information in the second-type resource configuration information, and the resource usage information can indicate the amount of resources used by the terminal device when performing the operation related to the AI model. The embodiment of the present disclosure is not limited to any specific content of the resource usage information. Optionally, the resource usage information may include the computing power used by the terminal device when perform the operation related to the AI model, i.e., the computing power invested by the terminal device when performing the operation related to the AI model.

To summarize, in the technical solutions according to the embodiments of the present disclosure, by including the time domain resource information, frequency domain resource information, space domain resource information, and code domain resource information in the first-type resource configuration information, the configuration of the first-type resource configuration information can avoid conflicts in data interaction between different terminal devices and the network device, and ensure the successful data interaction between the terminal devices and the network device.

In addition, in the technical solutions according to the embodiments of the present disclosure, by including the model usage information, model execution information, model operation information, model download information, data usage information, data reporting information, and resource usage information in the second-type resource configuration information, the configuration of the second-type resource configuration information can match the computing power, processing overhead, and storage space of the terminal device, so as to avoid AI service failure due to insufficient computing power or storage space for the terminal device to perform the AI task or execute the AI model, etc. The embodiment of the present disclosure configures the terminal device with the second-type resource configuration information for indicating the AI resource, which ensures proper operation of the AI service and improves the quality of the AI service executed by the terminal device.

The following describes the process for the terminal device to select a resource configuration combination from the first resource configuration information.

In an example, as shown in FIG. 4, the above method further includes the following step.

At step 322, the terminal device selects a first resource configuration combination from the first resource configuration information. The first resource configuration combination matches device operation information of the terminal device.

After receiving the first resource configuration information, the terminal device may select the first resource configuration combination from multiple resource configuration combinations of the first resource configuration information based on its own device operation information. That is, the entity that determines the first resource configuration combination may be the terminal device, and the basis may be the device operation information of the terminal device.

The device operation information may indicate the amount of resources available for the terminal device to execute services currently. The embodiment of the present disclosure is not limited to any specific content of the device operation information. Optionally, the device operation information of the terminal device may include: radio resource to be used by the terminal device and computing power to be used by the terminal device. Here, the radio resource to be used can be used for data interaction, and the computing power to be used can be used to execute AI services.

In the case where the device operation information includes the radio resource to be used and the computing power to be used, the above first resource configuration combination matching the device operation information of the terminal device may include: the first-type resource configuration information in the first resource configuration combination matching the radio resource to be used by the terminal device, and the second-type resource configuration information in the first resource configuration combination matching the computing power to be used by the terminal device.

In another example, the above method further includes the following steps.

At step 32A, the network device transmits resource indication information to the terminal device. The resource indication information indicates a first resource configuration combination in the first resource configuration information, the first resource configuration combination matching device operation information of the terminal device.

After transmitting the first resource configuration information to the terminal device, the network device may further transmit the resource indication information to the terminal device. The resource indication information indicates the first resource configuration combination. Optionally, before the step 32A, the method may further include: the terminal device transmitting the device operation information of the terminal device to the network device. After obtaining the device operation information, the network device may select the first resource configuration combination from multiple resource configuration combinations of the first resource configuration information based on the device operation information. That is, the entity that determines the first resource configuration combination may be the network device, and the basis may be the device operation information of the terminal device.

For the description of the device operation information, reference can be made to the first example above, which will not be repeated here.

The embodiment of the present disclosure is not limited to any transmission mode of the resource indication information. Optionally, the resource indication information may be carried in Downlink Control Information (DCI), such that the terminal device can parse the resource indication information when receiving the downlink control information. Alternatively, the resource indication information may be carried in a MAC CE. The embodiment of the present disclosure is not limited to any encapsulation manner of the resource indication information. Optionally, the resource indication information may be encapsulated into one signaling separately, or the resource indication information and other information may be combined and encapsulated into one signaling.

At step 32B, the terminal device selects the first resource configuration combination based on the resource indication information.

After receiving the resource indication information, the terminal device can parse the resource indication information, to determine to use the first resource configuration combination for executing the service.

In yet another example, the above method may further include the following steps.

At step 321, the network device transmits resource activation information to the terminal device. The resource activation information indicates m resource configuration combinations in the first resource configuration information.

After transmitting the first resource configuration information to the terminal device, the network device may further transmit the resource activation information to the terminal device. The resource activation information indicates m resource configuration combinations in the first resource configuration information, where m is a positive integer smaller than or equal to n. The embodiment of the present disclosure is not limited to any manner of determining the m resource configuration combinations. Optionally, the network device may determine the m resource configuration combinations according to a device identifier of the terminal device, such that the network device can determine different resource configuration combinations for different terminal devices. Thus, multiple terminal devices can share the first resource configuration information, thereby avoiding the need for the network device to configure different first resource configuration information for different terminal devices, and reducing the processing overhead at the network device. Alternatively, the network device may determine the m resource configuration combinations based on device operation information of the terminal device, such that the network device can determine different resource configuration combinations according to the amounts of available resources for the terminal device at different times. That is, when the network device detects that the device operation information of the terminal device changes, or the change satisfies a certain condition, the network device can obtain k resource configuration combinations by updating, where k is a positive integer smaller than or equal to n, and the updated resource activation information can be transmitted to the terminal device. The updated resource activation information indicates the k resource configuration combinations in the first resource configuration information.

The embodiment of the present disclosure is not limited to any transmission mode of the resource activation information. Optionally, the resource activation information may be carried in DCI, such that the terminal device can parse the resource activation information when receiving the downlink control information. Alternatively, the resource activation information may be carried in a MAC CE. The embodiment of the present disclosure is not limited to any encapsulation manner of the resource activation information. Optionally, the resource activation information may be encapsulated into one signaling separately, or the resource activation information and other information may be combined and encapsulated into one signaling.

At step 323, the terminal device activates the m resource configuration combinations based on the resource activation information.

After receiving the resource activation information, the terminal device activates the m resource configuration combinations from the n resource configuration combinations according to the m resource configuration combinations indicated in the resource activation information.

Optionally, after the above step 323, the method may further include the following step.

At step 325, the terminal device selects a first resource configuration combination from the m resource configuration combinations. The first resource configuration combination matches device operation information of the terminal device.

After the terminal device activates the m resource configuration combinations, it can use a certain resource configuration combination in the m resource configuration combinations to execute the service. In the embodiment of the present disclosure, the terminal device can select the first resource configuration combination from the m resource configuration combinations based on its own device operation information. That is, the entity that determines the first resource configuration combination from the m resource configuration combinations may be the terminal device, and the basis may be the device operation information of the terminal device.

For the description of the device operation information, reference can be made to the first example above, which will not be repeated here.

To summarize, with the technical solutions according to the embodiments of the present disclosure, the terminal device can determine the resource configuration combination that matches its device operation information from the resource configuration information, so as to avoid the situation where the amount of resources available to the terminal device does not support the selected resource configuration combination, which would cause the terminal device to fail to execute the service properly, thereby ensuring the quality and reliability of the service executed by the terminal device. Moreover, in the embodiment of the present disclosure, the entity that determines the resource configuration combination to be used is the terminal device, which can improve the flexibility of the terminal device in determining the resource configuration combination, and provide the terminal device with more space to autonomously select the resource configuration combination.

In addition, with the technical solutions according to the embodiments of the present disclosure, the resource indication information is transmitted to the terminal device by the network device, and the resource indication information may indicate the resource configuration combination that matches the device operation information of the terminal device, such that the terminal device, after receiving the resource indication information, can select the resource configuration combination determined by the network device from the multiple resource configuration combinations to execute the service. Since the determined resource configuration combination matches the device operation information of the terminal device, the quality and reliability of the service executed by the terminal device can be ensured.

In addition, with the technical solutions according to the embodiments of the present disclosure, the resource activation information is transmitted to the terminal device by the network device. The resource activation information can indicate at least one resource configuration combination, such that the terminal device can activate the at least one resource configuration combination according to the resource activation information, and select the resource configuration combination that matches its own device operation information from the activated resource configuration combination to execute the service, which ensures the quality and reliability of the service executed by the terminal device. In addition, after the network device configures the same resource configuration information for different terminal devices, it can control different terminal devices to activate different resource configuration combinations, such that the same resource configuration information can be shared without conflict between the terminal devices, thereby preventing the network device from configuring different resource configuration information for different terminal devices, and saving the processing overhead of the network device.

The technical solutions of the present disclosure will be described below with reference to a number of specific examples.

In an example, the first-type resource configuration information includes time-frequency resource information, the second-type resource configuration information includes an identifier of an AI model used by the terminal device, and the time-frequency resource information includes time domain information and frequency domain information.

Due to the limited computing power and processing overhead of the terminal device, only low-complexity AI models can be executed on the terminal devices but the "generalization ability" of low-complexity AI models is limited, that is, low-complexity AI models can only be applied to specific application scenarios and operation environments. Therefore, when the terminal device is in a mobile environment, for different AI tasks or in different AI operation environments, the terminal device needs to use different AI models. In addition, the amount of output data generated by different AI models is different, and the amount of output data needs to be uploaded to the network device. Therefore, an AI model and the time-frequency resource for transmitting the output data generated by the AI model need to match each other. For an AI model, the identifier of the AI model and the time-frequency resource for transmitting the output data generated by the AI model can be combined into a resource configuration combination, such that the terminal device can schedule the AI resource and the radio resource together, thereby ensuring matching between the AI resource and the radio resource, and avoiding a potential problem of insufficient radio resource or waste of radio resource due to separate scheduling of the AI resource and the radio resource, so as to ensure the quality and reliability of the AI service. In addition, since the AI resource and the radio resource can be scheduled together, the number of times the terminal device performs resource scheduling can be reduced, and the processing overhead of the terminal device can be reduced.

Figure 5:
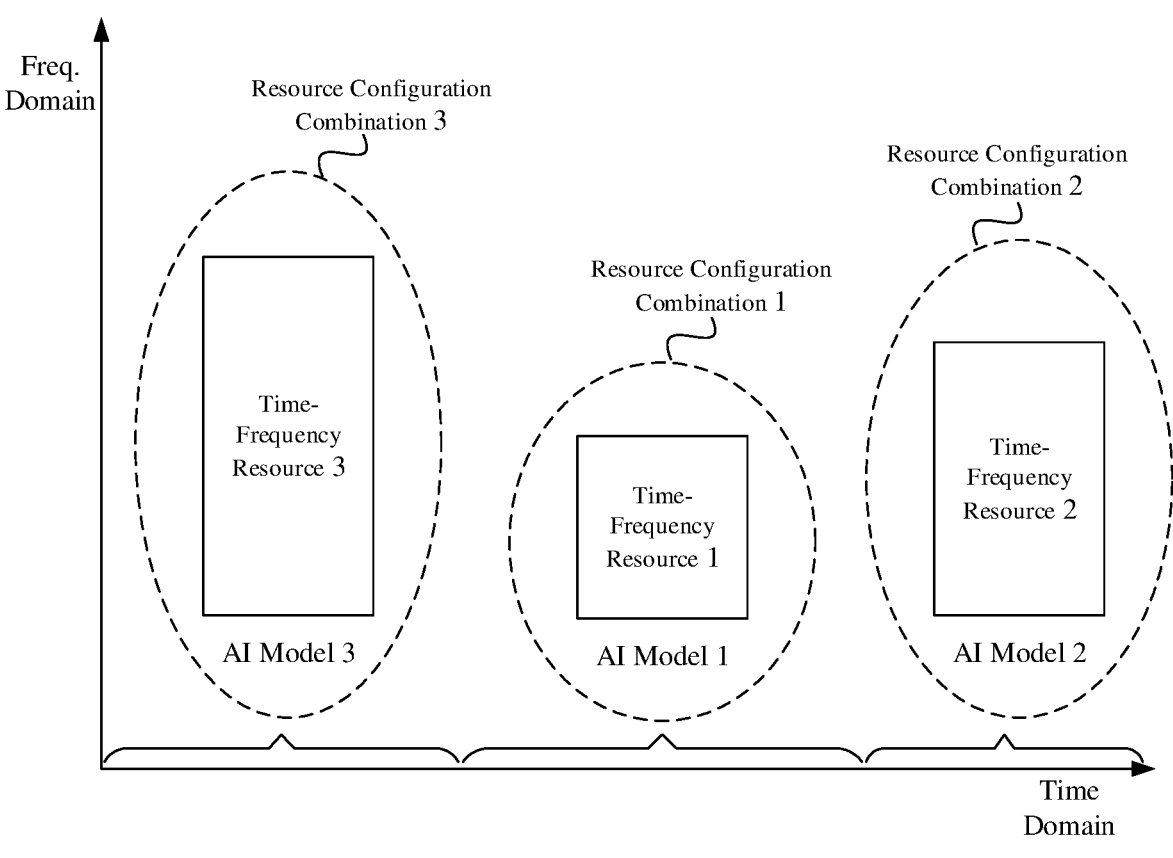
FIG. 5 is a schematic diagram showing a resource configuration combination according to an embodiment of the present disclosure.

As shown in FIG. 5, the amount of output data generated by AI Model 2 is higher than that of AI Model 1, and the amount of output data generated by AI Model 3 is higher than that of AI Model 2. As the AI model that the terminal needs to use changes, the terminal uses a resource configuration combination that includes corresponding time-frequency resources. As shown in Table 1 below, each resource configuration combination includes the identifier of the AI model used by the terminal device and the time-frequency resource information matching the AI model.

TABLE 1

| List of resource configuration combinations for AI model selection | | |
|---|---|---|
| Resource Configuration Combination | Identifier Of AI Model | Time-Frequency Resource Information |
| Resource Configuration Combination 1 | AI Model 1 | Time-Frequency Resource 1 |
| Resource Configuration Combination 2 | AI Model 2 | Time-Frequency Resource 2 |
| Resource Configuration Combination 3 | AI Model 3 | Time-Frequency Resource 3 |

Figure 6:
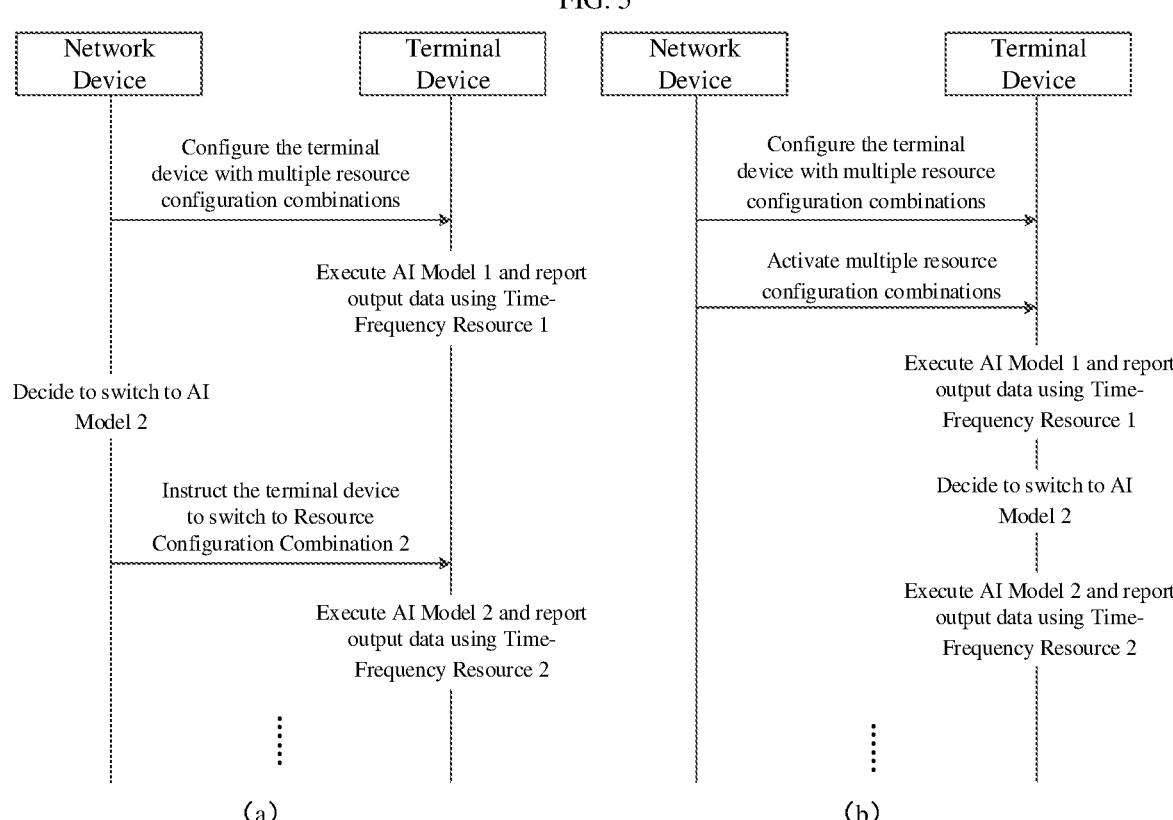
FIG. 6 is a flowchart illustrating a resource configuration method corresponding to FIG. 5.

As shown in FIG. 6, there are the following two schemes for the terminal device to switch the resource configuration combination.

FIG. 6 (*a*) shows the first scheme. The network device configures the terminal device with multiple resource configuration combinations, and the terminal device currently uses Resource Configuration Combination 1 to execute the service. When the network device finds that AI Model 1 should be switched to AI Model 2, it transmits resource indication information to the terminal device, and the terminal device switches from Resource Configuration Combination 1 to Resource Configuration Combination 2 according to the resource indication information. That is, the terminal device switches from executing AI Model 1 to executing AI Model 2, and from uploading output data using Time-Frequency Resource 1 to uploading output data using Time-Frequency Resource 2.

FIG. 6 (*b*) shows the second scheme. The network device configures multiple resource configuration combinations for the terminal device, and activates multiple resource configuration combinations. The terminal device currently uses Resource Configuration Combination 1 to execute the service. When the terminal device finds that it should switch from AI Model 1 to AI Model 2, it switches from Resource Configuration Combination 1 to Resource Configuration Combination 2. That is, the terminal device switches from executing AI Model 1 to executing AI Model 2, and from uploading output data using Time-Frequency Resource 1 to uploading output data using Time-Frequency Resource 2.

In another example, the first-type resource configuration information includes time-frequency resource information, the second-type resource configuration information includes information on model split points of the AI model used by the terminal device, and the time-frequency resource information includes time domain information and frequency domain information.

Figure 7:
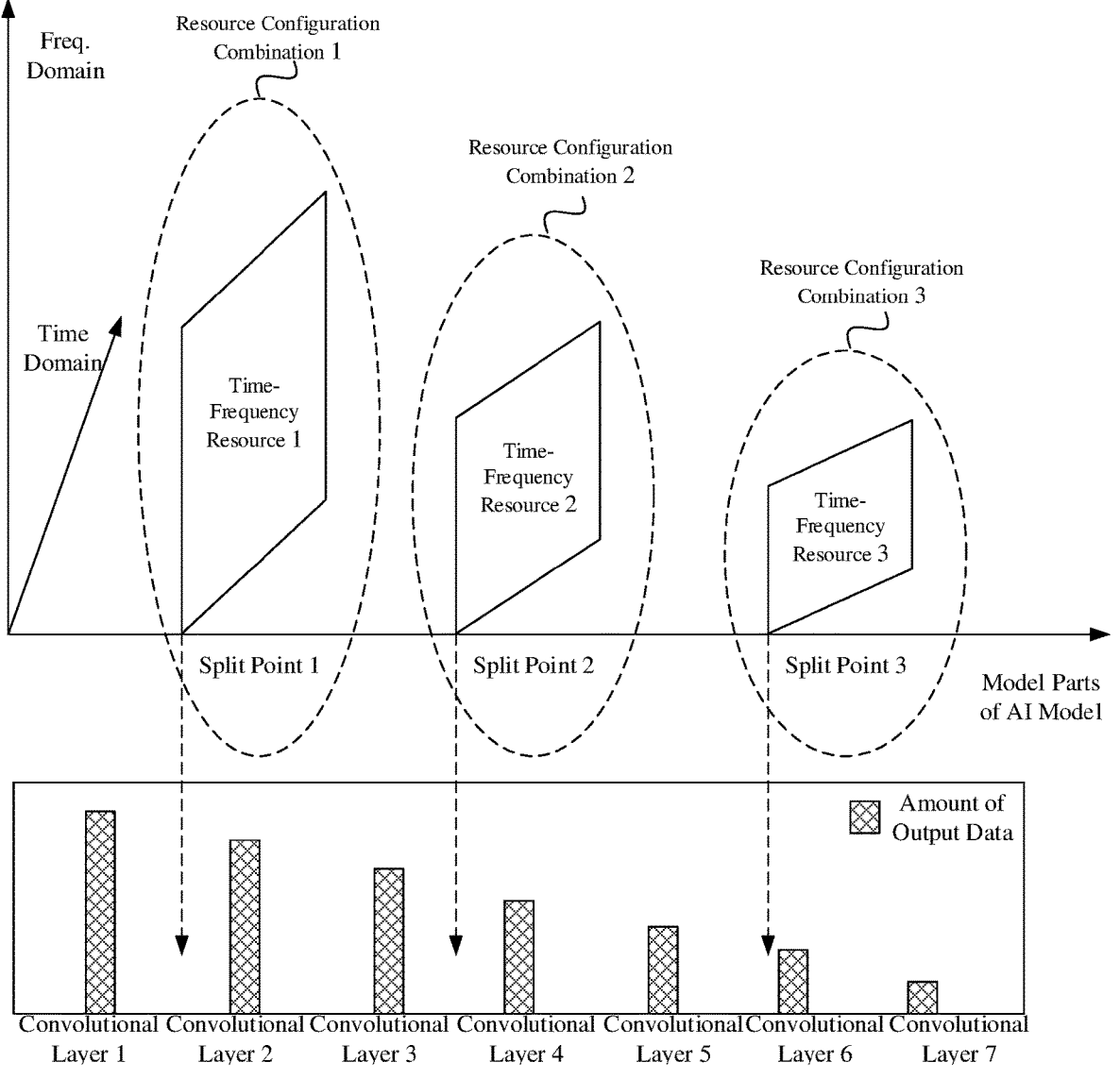
FIG. 7 is a schematic diagram showing a resource configuration combination according to another embodiment of the present disclosure.

When a specific AI model is used, due to the limited computing power of the terminal device, only a part of the AI model (such as some layers of a neural network) may be executed, while the remaining part of the AI model (such as the remaining layers of the neural network) needs to be executed by the network device. For example, a structure of a Convolutional Neural Networks (CNN) for image recognition is shown in FIG. 7. Different layers in the CNN have different amounts of computation and output data. For example, Split Point 1 has the largest amount of output data, but requires the smallest amount of computation at the terminal device. Split Point 2 has a smaller amount of output data than Split Point 1, but requires a larger amount of computation at the terminal device than Split Point 1. Split point 3 has the smallest amount of output data, but requires the largest amount of computation at the terminal device.

When the available computing power of the terminal device changes or the available radio resource of the terminal device changes, the AI model split point needs to be switched. Since the split point of the AI model and the time-frequency resource required for transmitting the output data need to match each other, an AI model split point and a corresponding time-frequency resource can be combined into a resource configuration combination, such that the terminal device can schedule the AI model split point and the corresponding radio resource together, thereby ensuring matching between the AI model split point and the radio resource, and avoiding a potential problem of insufficient radio resource or waste of radio resource due to separate scheduling of the AI model split point and the radio resource, so as to ensure the quality and reliability of the AI service. In addition, since the AI resource and the radio resource can be scheduled together, the number of times the terminal device performs resource scheduling can be reduced, and the processing overhead of the terminal device can be reduced.

As shown in FIG. 7, for Split Point 1, the terminal device needs to compute the smallest number of layers and thus has the smallest amount of computation, but has the largest amount of output data that needs to be reported. For Split Point 2, the number of layers that the terminal device needs to compute increases, and the amount of computation increases accordingly, but the amount of output data that needs to be reported decreases. For Split Point 3, the terminal device needs to calculate the largest number of layers and thus has the largest amount of computation, but has the smallest amount of output data that needs to be reported. As shown in Table 2 below, each resource configuration combination includes information on the model split point of the AI model used by the terminal device and time-frequency resource information.

TABLE 2

| List of resource configuration combinations for AI model splitting | | |
|---|---|---|
| Resource Configuration Combination | Model Split Point Of AI Model | Time-Frequency Resource Information |
| Resource Configuration Combination 1 | Split Point 1 | Time-Frequency Resource 1 |
| Resource Configuration Combination 2 | Split Point 2 | Time-Frequency Resource 2 |
| Resource Configuration Combination 3 | Split Point 3 | Time-Frequency Resource 3 |

As shown in FIG. 8, there are two cases that may lead to changes in the resource configuration combination used by the terminal device.

When the available computing power of the terminal device changes, the terminal device cannot provide the computing power required for the original split point, and another split point needs to be switched to and new radio resource matching it needs to be allocated. As shown in FIG. 8 (*a*), in the first period, the computing power of the terminal device can support Split Point 3. At this time, Time-Frequency Resource 3 with the smallest amount of time-frequency resource in Resource Configuration Combination 3 is used to report the output data. In the second period, when the computing power of the terminal device decreases, it needs to use Resource Configuration Combination 1, i.e., to switch to Split Point 1 and use Time-Frequency Resource 1 with the largest amount of time-frequency resource to report the output data. In the third period, the computing power of the terminal device increases, and Resource Configuration Combination 2 can be used instead, i.e., to switch to Split Point 2 and use Time-Frequency Resource 2 with a moderate amount of time-frequency resource to report the output data.

When the network device schedules a resource for the terminal device, the radio resource that can be scheduled to the terminal device may be affected by various factors, such as changes in wireless channel conditions, interference conditions, and the number of terminal devices. When the radio resource that the network device can schedule to the terminal device changes and the radio resource cannot support uploading of the output data for the original split point, another split point needed to be switched to. As shown in FIG. 8 (b), in the first period, the network device can schedule the maximum Time-Frequency Resource 1 to the terminal device, and the terminal can achieve the largest transmission amount of output data and can support Split Point 1. At this time, the terminal device needs to provide the smallest amount of computing power resource. In the second period, the time-frequency resource that the network device can schedule to the terminal device drops to the minimum Time-Frequency Resource 3, and Resource Configuration Combination 3 needs to be switched to, i.e., switch to Split Point 3. At this time, Split Point 3 requires the terminal device to provide the largest amount of computing power resource. In the third period, the maximum time-frequency resource that the network device can schedule to the terminal device rises to Time-Frequency Resource 2, and Resource Configuration Combination 2 can be used instead, i.e., switch to Split Point 2 to reduce the computing power resource invested by the terminal.

Figure 9:
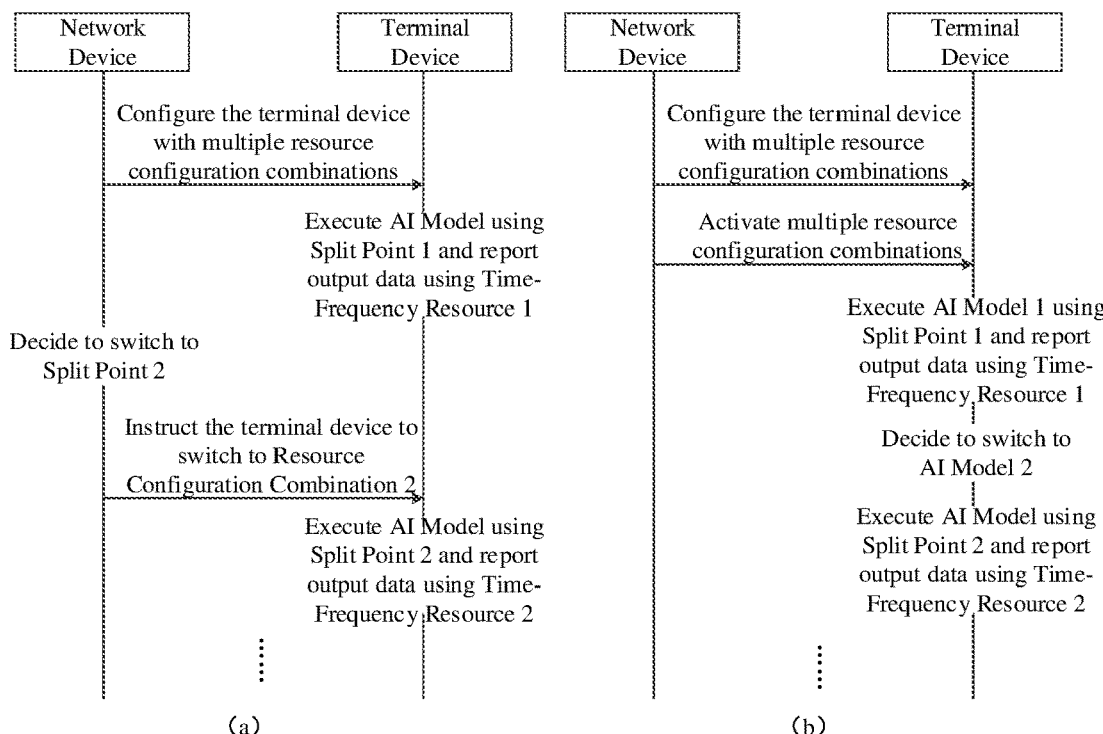
FIG. 9 is a flowchart illustrating a resource configuration method corresponding to FIG. 7.

As shown in FIG. 9, there are the following two schemes for the terminal device to switch the resource configuration combination.

FIG. 9 (a) shows the first scheme. The network device configures the terminal device with multiple resource configuration combinations, and the terminal device currently uses Resource Configuration Combination 1 to execute the service. When the network device finds that Split Point 1 needs to be switched to Split Point 2, it transmits resource indication information to the terminal device, and the terminal device switches from Resource Configuration Combination 1 to Resource Configuration Combination 2 according to the resource indication information. That is, the terminal device switches from executing the AI model using Split Point 1 to executing the AI model using Split Point 2, and from uploading output data using Time-Frequency Resource 1 to uploading output data using Time-Frequency Resource 2.

FIG. 9 (b) shows the second scheme. The network device configures multiple resource configuration combinations for the terminal device, and activates multiple resource configuration combinations. The terminal device currently uses Resource Configuration Combination 1 to execute the service. When the terminal device finds that it should switch from Split Point 1 to Split Point 2, it switches from Resource Configuration Combination 1 to Resource Configuration Combination 2. That is, the terminal device switches from executing the AI model using Split Point 1 to executing the AI model using Split Point 2, and from uploading output data using Time-Frequency Resource 1 to uploading output data using Time-Frequency Resource 2.

In yet another example, the first-type resource configuration information includes time-frequency resource information, the second-type resource configuration information includes information on the operation split point of the AI model used by the terminal device, and the time-frequency resource information includes time domain information and frequency domain information.

When the operation corresponding to the AI model consists of multiple steps or parts, due to the limited computing power resources of the terminal device, only some steps or parts of the operation corresponding to the AI model may be executed, while the remaining steps or parts of the operation corresponding to the AI model needs to be executed by the network device. When the available computing power resource of the terminal device changes or the radio resource for transmitting output data changes, the steps or parts corresponding to the AI model that the terminal device is responsible for need to be adjusted. The operation split point corresponding to an AI model and the time-frequency resource required for transmitting output data need to match each other, and the operation split point corresponding to the AI model and its corresponding time-frequency resource can be combined into one resource configuration combination, such that the terminal device can schedule the operation split point of the AI model and the corresponding radio resource at the same time, thereby ensuring matching between the operation split point of the AI model and the radio resource, and avoiding a potential problem of insufficient radio resource or waste of radio resource due to separate scheduling of the AI resource and the radio resource, so as to ensure the quality and reliability of the AI service. In addition, since the AI resource and the radio resource can be scheduled together, the number of times the terminal device performs resource scheduling can be reduced, and the processing overhead of the terminal device can be reduced.

Figure 10:
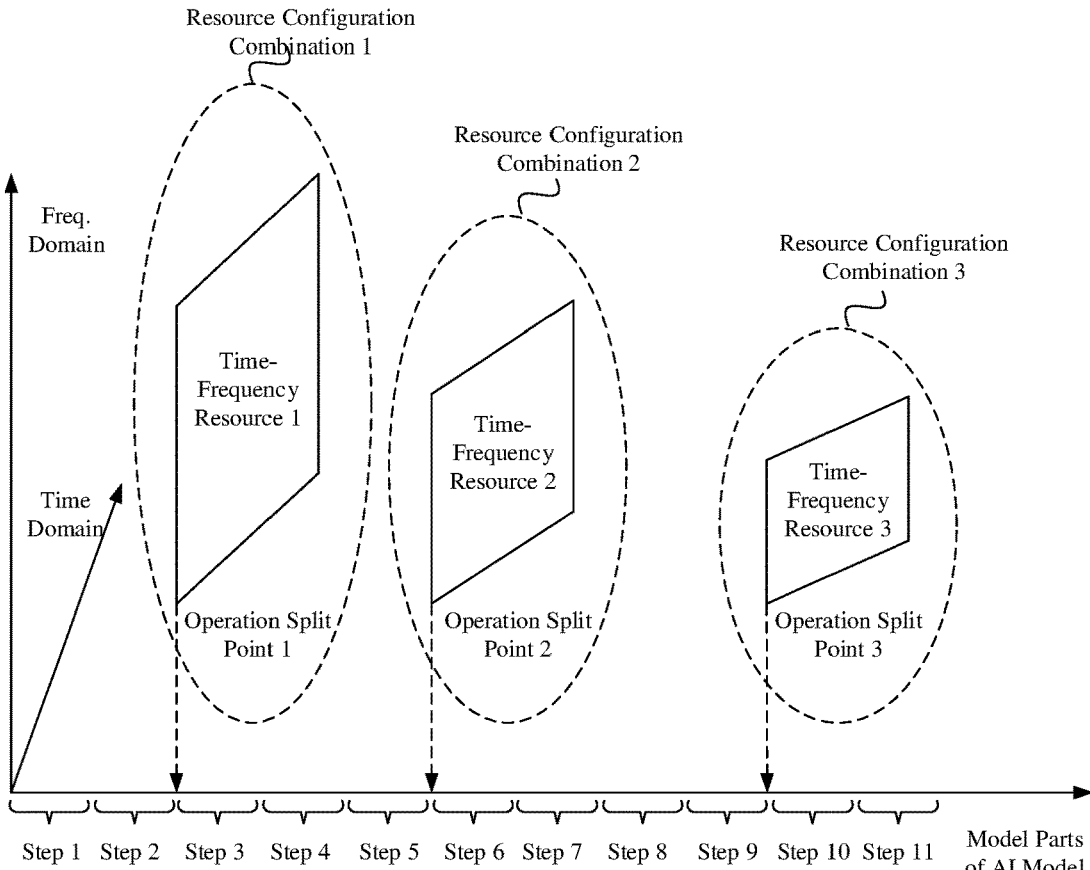
FIG. 10 is a schematic diagram showing a resource configuration combination according to another embodiment of the present disclosure.

As shown in FIG. 10, for Operation Split Point 1, the terminal device is responsible for executing the smallest number of steps and thus has the smallest amount of computation, but has the largest amount of output data that needs to be reported. For Operation Split Point 2, the number of steps that the terminal device is responsible for executing increases and the amount of computation increases accordingly, but the amount of output data that needs to be reported decreases. For Operation Split Point 3, the terminal device is responsible for executing the largest number of steps and thus has the largest amount of computation, but has the smallest amount of output data that needs to be reported. As shown in Table 3 below, each resource configuration combination includes information on operation split point of the AI model used by the terminal device and time-frequency resource information.

TABLE 3

| List of resource configuration combinations for AI operation splitting | | |
| --- | --- | --- |
| Resource Configuration Combination | Operation Split Point Of AI Model | Time-Frequency Resource Information |
| Resource Configuration Combination 1 | Operation Split Point 1 (Terminal Device Responsible For Steps 1 To 3) | Time-Frequency Resource 1 |
| Resource Configuration Combination 2 | Operation Split Point 2 (Terminal Device Responsible For Steps 1 To 5) | Time-Frequency Resource 2 |
| Resource Configuration Combination 3 | Operation Split Point 3 (Terminal Device Responsible For Steps 1 To 8) | Time-Frequency Resource 3 |

As shown in FIG. 11, there are two cases that may lead to changes in the resource configuration combination used by the terminal device.

When the available computing power of the terminal device changes, the terminal device cannot provide the computing power required for the original operation split point, and another operation split point needs to be switched to and new radio resource matching it needs to be allocated. As shown in FIG. 11(*a*), in the first period, the computing power of the terminal device can complete Steps 1 to 8 (Operation Split Point 3). At this time, Time-Frequency Resource 3 with the smallest amount of resource in Resource Configuration Combination 3 is used to report output data. In the second period, the computing power of the terminal device decreases and only Steps 1 to 3 can be completed. The terminal device needs to use Resource Configuration Combination 1, i.e., switch to Operation Split Point 1 and use Time-Frequency Resource 1 with the largest amount of time-frequency resource to report output data. In the third period, the computing power of the terminal device rises and Steps 1 to 5 can be completed. The terminal device can switch to Resource Configuration Combination 2, i.e., switch to Operation Split Point 2 and use Time-Frequency Resource 2 with a moderate amount of resource to report output data.

When the network device schedules a resource for the terminal device, the radio resource that can be scheduled to the terminal device may be affected by various factors, such as changes in wireless channel conditions, interference conditions, and the number of terminal devices. When the radio resource that the network device can schedule to the terminal device changes, the radio resource cannot support uploading of the output data for the original operation split point, and another operation split point needs to be switched to. As shown in FIG. 11(*b*), in the first period, the network device can schedule the maximum Time-Frequency Resource 1 to the terminal device, the terminal can achieve the largest transmission amount of output data and can support Operation Split Point 1 (the terminal device is responsible for Steps 1 to 3). At this time, the terminal device needs to provide the smallest amount of computing power resource. In the second period, the time-frequency resource that can be scheduled to the terminal device drops to the minimum Time-Frequency Resource 3, and it needs to switch to Resource Configuration Combination 3, i.e., switch to Operation Split Point 3 (the terminal device is responsible for Steps 1 to 8). At this time, the terminal device needs to provide the largest amount of computing power resource. In the third time period, the maximum time-frequency resource that the network device can schedule to the terminal device rises to Time-Frequency Resource 2, and Resource Configuration Combination 2 can be used instead, i.e., switch to Operation Split Point 2 (the terminal device is responsible for Steps 1 to 5) to reduce the computing power resource invested by the terminal device.

Figure 12:
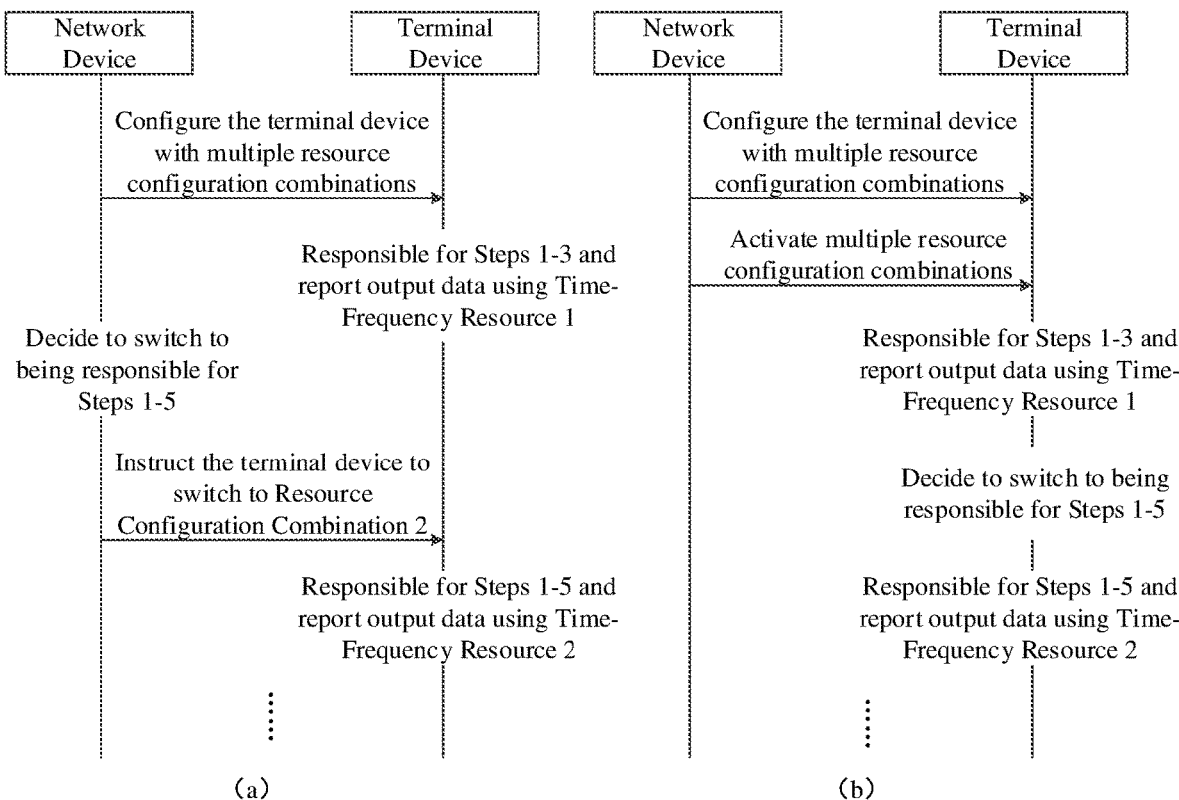
FIG. 12 is a flowchart illustrating a resource configuration method corresponding to FIG. 10.

As shown in FIG. 12, there are the following two schemes for the terminal device to switch the resource configuration combination.

FIG. 12 (*a*) shows the first scheme. The network device configures the terminal device with multiple resource configuration combinations, and the terminal device currently uses Resource Configuration Combination 1 to execute the service. When the network device finds that Operation Split Point 1 (the terminal device is responsible for Steps 1 to 3) needs to be switched to Operation Split Point 2 (the terminal device is responsible for Steps 1 to 5), it transmits resource indication information to the terminal device, and the terminal device switches from Resource Configuration Combination 1 to Resource Configuration Combination 2 according to the resource indication information. That is, the terminal device switches from being responsible for Steps 1 to 3 to being responsible for Steps 1 to 5, and from uploading output data using Time-Frequency Resource 1 to uploading output data using Time-Frequency Resource 2.

FIG. 12 (*b*) shows the second scheme. The network device configures multiple resource configuration combinations for the terminal device, and activates multiple resource configuration combinations. The terminal device currently uses Resource Configuration Combination 1 to execute the service. When the terminal device finds that it should switch from Operation Split Point 1 (the terminal device is responsible for Steps 1 to 3) to Operation Split Point 2 (the terminal device is responsible for Steps 1 to 5), it switches from Resource Configuration Combination 1 to Resource Configuration Combination 2. That is, the terminal device switches from being responsible for Steps 1 to 3 to being responsible for Steps 1 to 5, and from uploading output data using Time-Frequency Resource 1 to uploading output data using Time-Frequency Resource 2.

In yet another example, the first-type resource configuration information includes time-frequency resource information, the second-type resource configuration information includes a reporting period for the terminal device to report the training result of the AI model, and the time-frequency resource information includes time domain information and frequency domain information.

When the terminal device participates in distributed learning or federated learning, the number of training rounds that the terminal device can complete in unit time varies depending on the available computing power of the terminal device and the time-frequency resource available for data transmission. In addition, the shorter the reporting period of the training data is, the more the required computing power resource and time-frequency resource will be. When the available computing power resource of the terminal device changes or the time-frequency resource available for data transmission changes, the interval period at which the terminal device reports the training data also needs to be adjusted. However, the reporting period of a certain training data and the time-frequency resource required for transmitting the output data need to match each other. The reporting period of the training data and the corresponding time-frequency resource can be combined into a resource configuration combination, such that the terminal device can schedule the reporting period of the training data and the corresponding radio resource together, thereby ensuring matching between the reporting period of the training data and the radio resource, and avoiding a potential problem of insufficient radio resource or waste of radio resource due to separate scheduling of the reporting period of the training data and the radio resource, so as to ensure the quality and reliability of the AI service. In addition, since the AI resource and the radio resource can be scheduled together, the number of times the terminal device performs resource scheduling can be reduced, and the processing overhead of the terminal device can be reduced.

As shown in Table 4 below, each resource configuration combination includes a reporting period of training data and time-frequency resource information. In the first Reporting Period of Training Data 1, the terminal device has the longest interval for reporting training data, has the smallest amount of computation per unit time, and requires the smallest amount of time-frequency resource for transmitting output data. In the second Reporting Period of Training Data 2, the interval at which the terminal device reports training data is shortened, the amount of computation per unit time increases, and the time-frequency resource required for transmitting output data also increases. In the third Reporting Period of Training Data 3, the terminal device has the shortest interval for reporting training data, has the largest amount of computation per unit time, and requires the largest amount of time-frequency resource for transmitting output data.

TABLE 4

List of resource configuration combinations for adjusting
reporting period of training result of the AI model

| Resource Configuration Combination | Reporting Period of Training Result of AI Model | Time-Frequency Resource Information |
|---|---|---|
| Resource Configuration Combination 1 | Reporting Period 1 (every 200 ms) | Time-Frequency Resource 1 |
| Resource Configuration Combination 2 | Reporting Period 2 (every 100 ms) | Time-Frequency Resource 2 |
| Resource Configuration Combination 3 | Reporting Period 3 (every 50 ms) | Time-Frequency Resource 3 |

Figure 13:
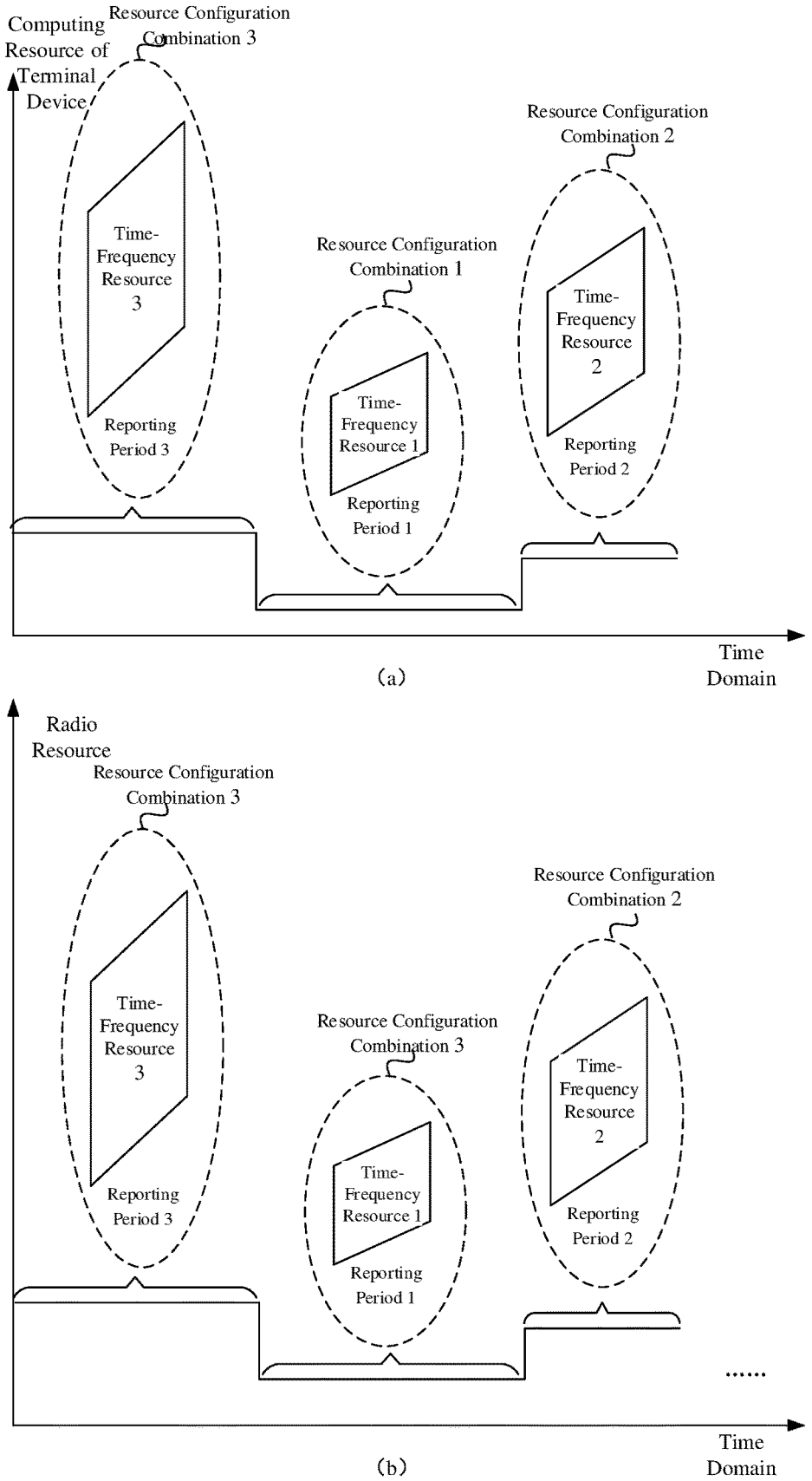
FIG. 13 is a schematic diagram of a resource configuration method according to an embodiment of the present disclosure.

As shown in FIG. 13, there are two cases that may lead to changes in the resource configuration combination used by the terminal device.

When the available computing power of the terminal device changes, the terminal device cannot support the original reporting period of training result of the AI model, and needs to switch to another reporting period of training result and new radio resource matching it needs to be allocated. As shown in FIG. 13(*a*), in the first period, the computing power of the terminal device can complete a round of training and report the training result every 50 milliseconds (Reporting Period 3). At this time, Time-Frequency Resource 3 with the largest amount of time-frequency resource in Resource Configuration Combination 3 is used to report the training result. In the second period, the computing power of the terminal device decreases, and can only complete a round of training and report the training result every 200 milliseconds (Reporting Period 1), which requires to use Resource Configuration Combination 1, i.e., to switch to Reporting Period 1 and use Time-Frequency Resource 1 with the smallest amount of time-frequency resource to report the output data. In the third period, the computing power of the terminal device rises, and the terminal device can complete a round of training and report the training result every 100 milliseconds (Reporting Period 2). At this time, Resource Configuration Combination 2 can be used instead, i.e., to switch to Reporting Period 2 and use Time-Frequency Resource 2 with a moderate amount of resource to report output data.

When the network device schedules a resource for the terminal device, the radio resource that can be scheduled to the terminal device may be affected by various factors, such as changes in wireless channel conditions, interference conditions, and the number of terminal devices. When the radio resource that can be scheduled by the network device to the terminal device changes and the radio resources cannot support the original reporting period of training result, another reporting period needs to be switched to. As shown in FIG. 13(*b*), in the first period, the network device can schedule the maximum Time-Frequency Resource 3 to the terminal device, and the terminal can achieve the largest transmission amount of output data and can support reporting training result every 50 milliseconds (Reporting Period 3). At this time, the terminal device needs to provide the largest amount of computing power resource. In the second period, the time-frequency resource that can be scheduled to the terminal device drops to the minimum Time-Frequency Resource 1, and it needs to switch to Resource Configuration Combination 1, i.e., to switch to reporting the training result every 200 milliseconds (Reporting Period 1). At this time, the terminal device is required to provide the smallest amount of computing power resource. In the third period, the maximum time-frequency resource that the network device can schedule to the terminal device rises to Time-Frequency Resource 2, and Resource Configuration Combination 2 can be used instead, i.e., switch to reporting training result every 100 milliseconds (Reporting Period 1). At the same time, the computing power resource invested by terminal device also rises.

Figure 14:
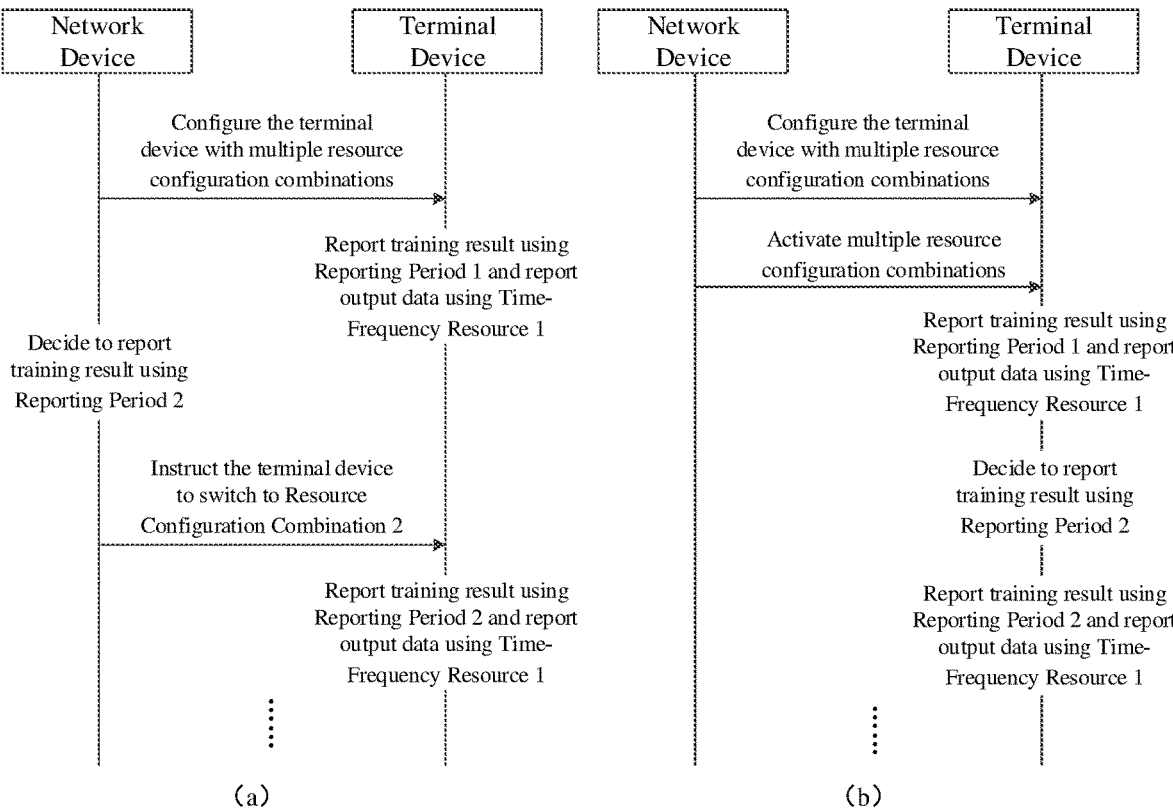
FIG. 14 is a flowchart of a resource configuration method corresponding to FIG. 13.

As shown in FIG. 14, there are the following two schemes for the terminal device to switch the resource configuration combination.

FIG. 14(*a*) shows the first scheme. The network device configures the terminal device with multiple resource configuration combinations, and the terminal device currently uses Resource Configuration Combination 1 to execute the service. When the network device finds that Reporting Period 1 (every 200 milliseconds) needs to be switched to Reporting Period 2 (every 100 milliseconds), it transmits resource indication information to the terminal device, and the terminal device switches from Resource Configuration Combination 1 to Resource Configuration Combination 2 according to the resource indication information. That is, the terminal device switches from reporting the training result every 200 milliseconds to reporting the training result every 100 milliseconds, and from uploading the training result using Time-Frequency Resource 1 to uploading the training result using Time-Frequency Resource 2.

FIG. 14(*b*) shows the second scheme. The network device configures multiple resource configuration combinations for the terminal device and activates multiple resource configuration combinations. The terminal device currently uses Resource Configuration Combination 1 to execute the service. When the terminal device finds that it should switch from Reporting Period 1 (every 200 milliseconds) to Reporting Period 2 (every 100 milliseconds), it switches from Resource Configuration Combination 1 to Resource Configuration Combination 2. That is, the terminal device switches from reporting the training result every 200 milliseconds to reporting the training result every 100 milliseconds, and from uploading the training result using Time-Frequency Resource 1 to uploading the training result using Time-Frequency Resource 2.

In yet another example, the first-type resource configuration information includes time-frequency resource information, the second-type resource configuration information includes computing power used by the terminal device to perform the operation related to the AI model, and the time-frequency resource information includes time domain information and frequency domain information.

For a certain AI task, the computing power resource invested by the terminal device and the time-frequency resource required for transmitting output data need to match each other, and the computing power resource and the corresponding time-frequency resource can be combined into a resource configuration combination, such that the terminal device can schedule the computing power resource and the corresponding radio resource at the same time, thereby ensuring matching between the computing power resource and the radio resource, and avoiding a potential problem of insufficient radio resource or waste of radio resource due to separate scheduling of the computing power resource and the radio resource, so as to ensure the quality and reliability of the AI service. In addition, since the AI resource and the radio resource can be scheduled together, the number of times the terminal device performs resource scheduling can be reduced, and the processing overhead of the terminal device can be reduced.

As shown in Table 5 below, each resource configuration combination includes a computing power resource and time-frequency resource information of the terminal device. At the first computing power level, the terminal device invests the largest amount of computing power resource, but requires the smallest amount of time-frequency resource for transmitting the output data. At the second computing power level, the computing power resource invested by the terminal device decreases, but the required amount of time-frequency resource for transmitting the output data increases. At the third computing power level, the terminal device invests the smallest amount of computing power resource, but requires the largest amount of time-frequency resource for transmitting the output data.

TABLE 5

List of resource configuration combinations of computing power for performing the operation related to the AI model

| Resource Configuration Combination | Computing Power For Performing Operation Related To AI Model | Time-Frequency Resource |
|---|---|---|
| Resource Configuration Combination 1 | Computing Power 1 (High Computing Power) | Time-Frequency Resource 1 |
| Resource Configuration Combination 2 | Computing Power 2 (Medium Computing Power) | Time-Frequency Resource 2 |
| Resource Configuration Combination 3 | Computing Power 3 (Low Computing Power) | Time-Frequency Resource 3 |

Figure 15:
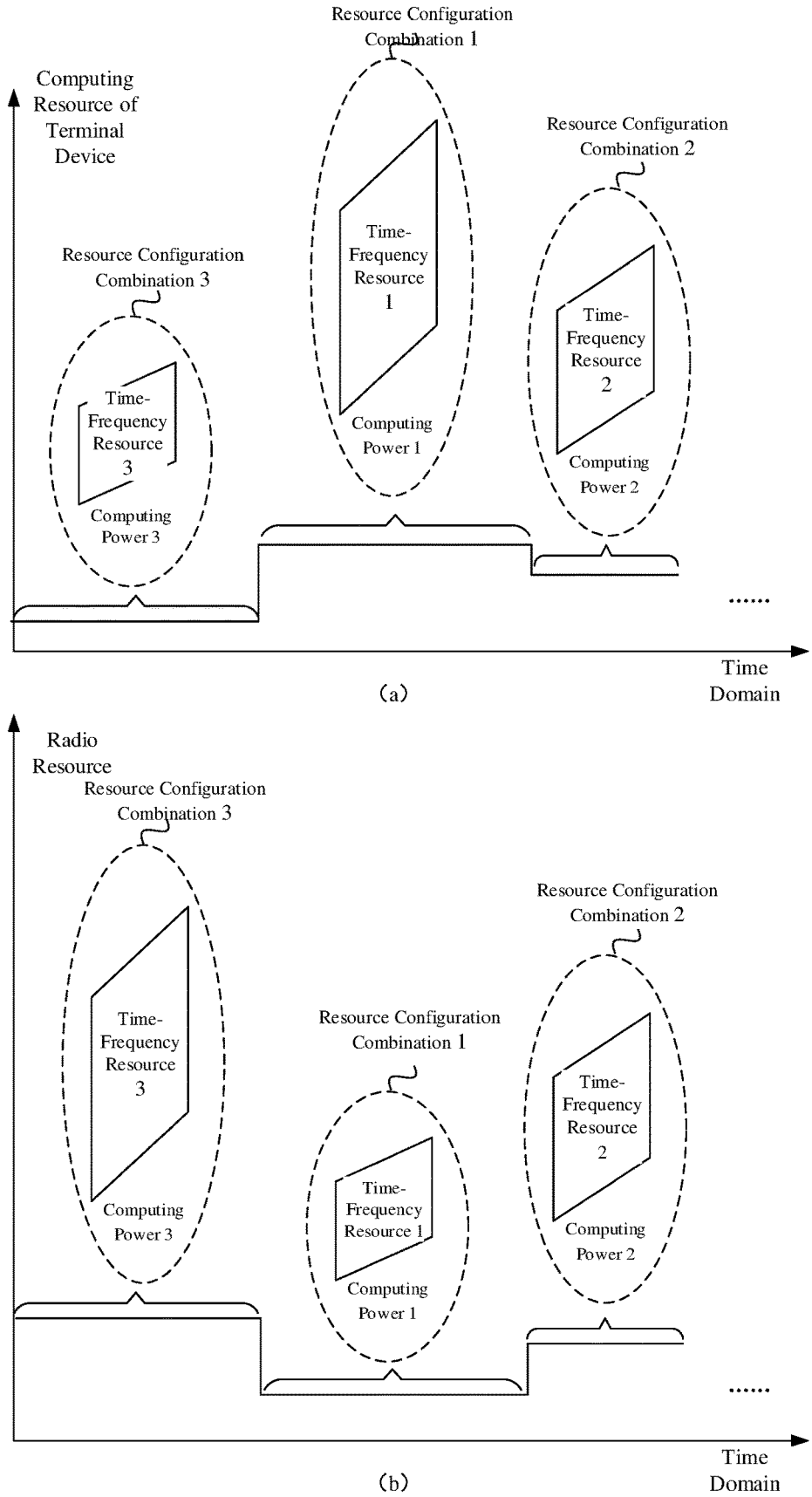
FIG. 15 is a schematic diagram showing a resource configuration method according to another embodiment of the present disclosure.

As shown in FIG. 15, there are two cases that may lead to changes in the resource configuration combination used by the terminal device.

When the available computing power of the terminal device changes, the terminal device cannot support the original AI operation, and needs to switch to a lower computing power level, and new radio resource matching it needs to be allocated. As shown in FIG. 15(a), in the first period, the terminal device can only invest a low computing power level (Computing Power 3). At this time, Time-Frequency Resource 3 with the largest amount of time-frequency resource in Resource Configuration Combination 3 is used to report the training result. In the second period, the computing power level of the terminal device increases, it can be switched to Resource Configuration Combination 1, and Time-Frequency Resource 1 with the smallest amount of time-frequency resource can be used to report the output data, so as to save radio resource. In the third period, the computing power of the terminal device decreases to Computing Power level 2, it can be switched to Resource Configuration Combination 2, and Time-Frequency Resource 2 with a moderate amount of resource can be used to report the output data.

When the network device schedules a resource for the terminal device, the radio resource that can be scheduled to the terminal device may be affected by various factors, such as changes in wireless channel conditions, interference conditions, and the number of terminal devices. When the radio resource that the network device can schedule to the terminal device changes and the radio resource cannot support the terminal device to maintain the original computing power level, and another computing power level needs to be switched to. As shown in FIG. 15(b), in the first period, the network device can schedule the maximum Time-Frequency Resource 3 to the terminal device, and the terminal device can invest the minimum computing power (Computing Power 3). In the second period, the time-frequency resource that the network device can schedule to the terminal device drops to the minimum Time-Frequency Resource 1, the terminal device must increase the computing power level to Computing Power 1. In the third period, the maximum time-frequency resource that the network device can schedule to the terminal device rises to Time-Frequency Resource 2, and the terminal device can decrease the computing power level to Computing Power 2.

Figures 16, 17:
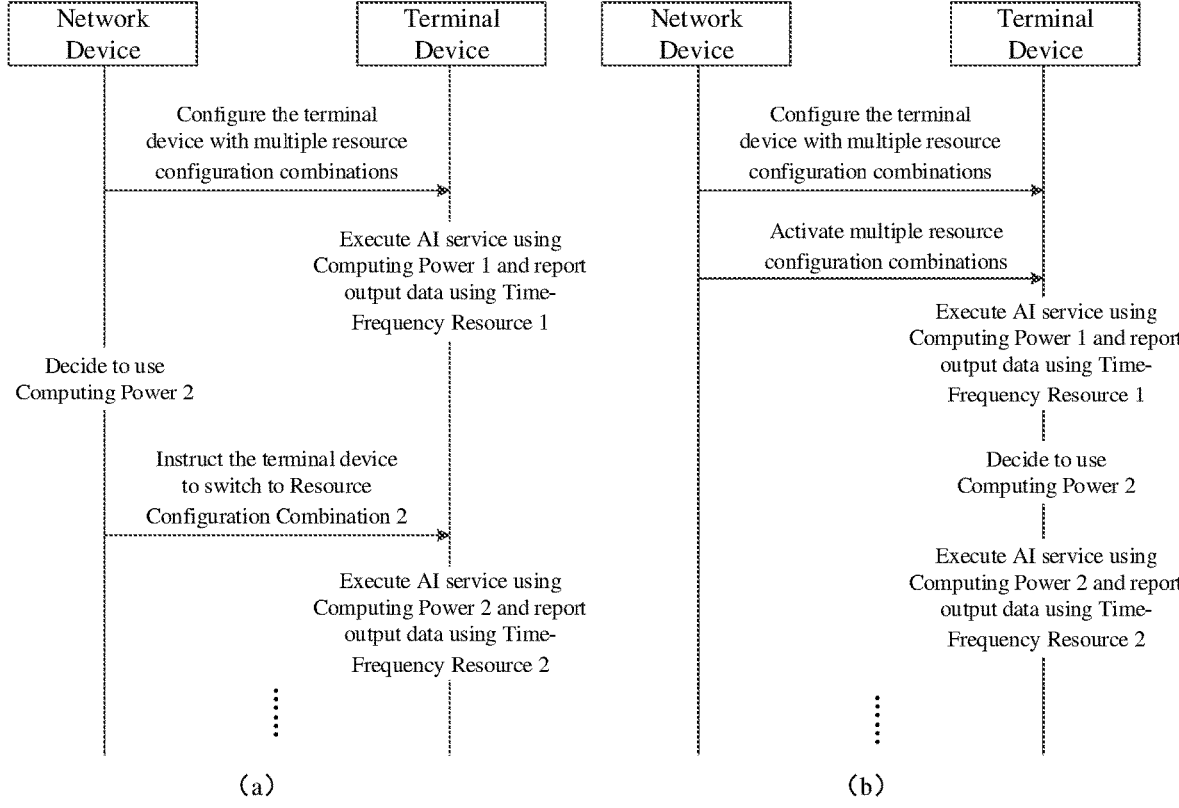
FIG. 16 is a flowchart illustrating a resource configuration method corresponding to FIG. 15.
FIG. 17 is a block diagram of a resource configuration apparatus according to an embodiment of the present disclosure.

As shown in FIG. 16, there are the following two schemes for the terminal device to switch the resource configuration combination.

FIG. 16 (a) shows the first scheme. The network device configures the terminal device with multiple resource configuration combinations, and the terminal device currently uses Resource Configuration Combination 1 to execute the service. When the network device finds that the computing power level of the terminal device can be reduced (from Computing Power 1 to Computing Power 2), it transmits resource indication information to the terminal device, and the terminal device switches from Resource Configuration Combination 1 to Resource Configuration Combination 2 according to the resource indication information. That is, the terminal device switches from high computing power to medium computing power and from uploading output data using Time-Frequency Resource 1 to uploading output data using Time-Frequency Resource 2.

FIG. 16(b) shows the second scheme. The network device configures multiple resource configuration combinations for the terminal device, and activates multiple resource configuration combinations. The terminal device currently uses Resource Configuration Combination 1 to execute the service. When the terminal device can reduce the computing power level (from Computing Power 1 to Computing Power 2), it switches from Resource Configuration Combination 1 to Resource Configuration Combination 2. That is, the terminal device switches from high computing power to medium computing power and from uploading output data using Time-Frequency Resource 1 to uploading output data using Time-Frequency Resource 2.

It should be noted that, in the above method embodiments, the technical solutions of the present disclosure are mainly described from the perspective of interaction between the terminal device and the network device. The above steps performed by the terminal device can be independently implemented as a resource configuration method at the terminal device, and the above steps performed by the network device can be independently implemented as a resource configuration method at the network device.

The apparatus embodiments of the present disclosure will be described below, which can be used to execute the method embodiments of the present disclosure. For details not disclosed in the apparatus embodiments of the present disclosure, reference can be made to the method embodiments of the present disclosure.

Referring to FIG. 17, which shows a block diagram of a resource configuration apparatus according to an embodiment of the present disclosure, the apparatus has the function of implementing the above exemplary method at the terminal device. The function may be implemented by hardware, or by executing corresponding software by hardware. The apparatus may be the above terminal device, or may be provided in the terminal device. As shown in FIG. 17, the apparatus 1700 may include: a configuration information receiving module 1710.

The configuration information receiving module 1710 is configured to receive first resource configuration information from a network device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In an example, the second-type resource configuration information may include at least one of: model usage information indicating an AI model used by the terminal device; model execution information indicating a part of the model that the terminal device is responsible for executing in the AI model used by the terminal device; model operation information indicating that a part of operation that the terminal device is responsible for executing in the AI model used by the terminal device; model download information indicating an AI model downloaded by the terminal device; data usage information indicating training data used by the terminal device when training the AI model; data reporting information indicating a frequency at which the terminal device reports a training result of the AI model; or resource usage information indicating an amount of resources used by the terminal device when performing an operation related to the AI model.

In an example, the model usage information may include: an identifier of the AI model used by the terminal device.

In an example, the model execution information may include: information on a model split point of the AI model used by the terminal device.

In an example, the model operation information may include: information on an operation split point of the AI model used by the terminal device.

In an example, the model download information may include: an identifier of the AI model downloaded by the terminal device.

In an example, the data usage information may include: an amount of training data used by the terminal device when training the AI model.

In an example, the data reporting information may include: a reporting period for the terminal device to report the training result of the AI model.

In one example, the resource usage information may include: computing power used by the terminal device when performing the operation related to the AI model.

In an example, the first-type resource configuration information may include at least one of: time domain resource information, frequency domain resource information, space domain resource information, or code domain resource information.

In an example, the first resource configuration information may be carried in Radio Resource Control (RRC) configuration information; or the first resource configuration information may be carried in system information.

Figure 18:
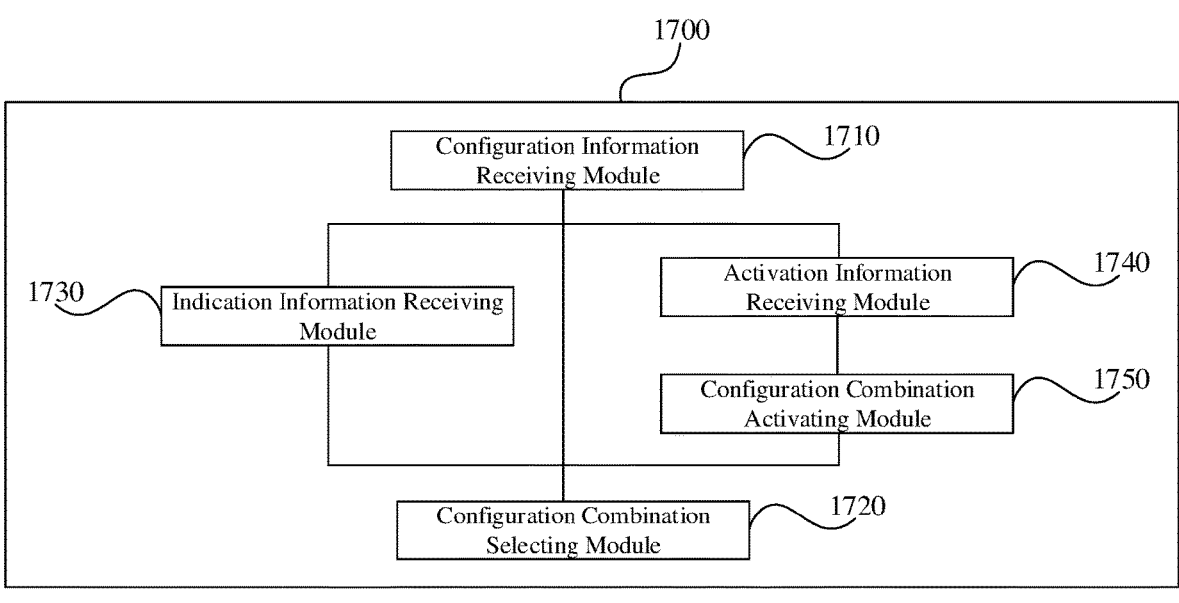
FIG. 18 is a block diagram of a resource configuration apparatus according to another embodiment of the present disclosure.

In an example, as shown in FIG. 18, the apparatus 1700 may further include: a configuration combination selecting module 1720 configured to select a first resource configuration combination from the first resource configuration information, the first resource configuration combination matching device operation information of the terminal device.

In an example, as shown in FIG. 18, the apparatus 1700 may further include: an indication information receiving module 1730 configured to receive resource indication information from the network device, the resource indication information indicating a first resource configuration combination in the first resource configuration information, the first resource configuration combination matching device operation information of the terminal device; and a configuration combination selecting module 1720 configured to select the first resource configuration combination based on the resource indication information.

In an example, the resource indication information may be carried in Downlink Control Information (DCI); or the resource indication information may be carried in a Medium Access Control (MAC) Control Element (CE).

In an example, as shown in FIG. 18, the apparatus 1700 may further include: an activation information receiving module 1740 configured to receive resource activation information from the network device, the resource activation information indicating m resource configuration combinations in the first resource configuration information, where m is a positive integer smaller than or equal to n; and a configuration combination activating module 1750 configured to activate the m resource configuration combinations based on the resource activation information.

In an example, as shown in FIG. 18, the apparatus 1700 may further include: a configuration combination selecting module 1720 configured to select a first resource configuration combination from the m resource configuration combinations, the first resource configuration combination matching device operation information of the terminal device.

In an example, the resource activation information may be carried in DCI; or, the resource activation information may be carried in a MAC CE.

In an example, the device operation information of the terminal device may include: a radio resource to be used by the terminal device and computing power to be used by the terminal device. The first resource configuration combination matching the device operation information of the terminal device may include: the first-type resource configuration information in the first resource configuration combination matching the radio resource to be used by the terminal device, and the second-type resource configuration information in the first resource configuration combination matching the computing power to be used by the terminal device.

To summarize, with the technical solutions according to the embodiments of the present disclosure, the resource configuration information is transmitted to the terminal device by the network device. The resource configuration information includes multiple resource configuration combinations each including multiple types of resource configuration information, thereby providing a method for configuring multiple resource combinations. In addition, the embodiments of the present disclosure configure multiple types of resources in combination, such that the network device can schedule the multiple types of resources by performing one resource scheduling. When compared with the solution in which multiple times of resource scheduling are required for scheduling multiple types of resources separately, the solution of combined configuration according to the embodiments of the present disclosure can reduce the number of times the network device performs resource scheduling, reduce the processing overhead of the network device, and save data transmission resources.

In addition, in the embodiments of the present disclosure, each resource configuration combination may include two types of resource configuration information: one type of resource configuration information indicating the radio resource configuration, and the other type of resource configuration information indicating the AI resource configuration, so as to achieve combined configuration of the radio resource and the AI resource. When compared with a case where the radio resource and the AI resource are configured separately which may lead to the problem that the radio resource and the AI resource does not match each other, the embodiments of the present disclosure configure the radio resource and the AI resource that match each other together to form a resource configuration combination, which ensures both the adequacy of the radio resource and the quality of the AI service, thereby improving the utilization of the radio resource, and avoiding waste of radio resource or insufficient radio resource for data interaction when they are configured separately. It also improves the reliability of the AI service and avoids waste of the AI resource or insufficient AI resource for AI operations in the case of separate configurations.

Figure 19:
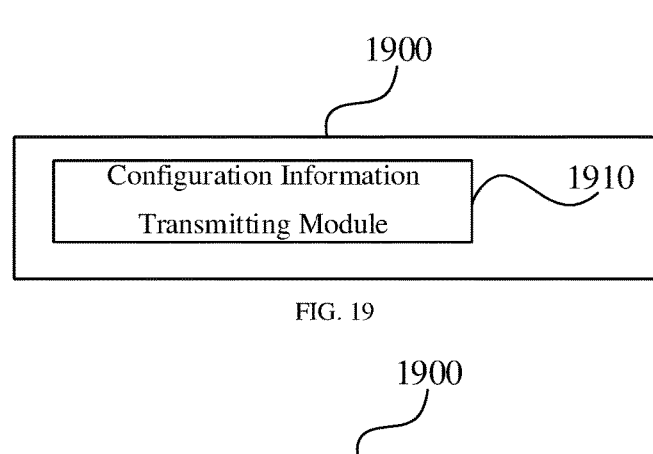
FIG. 19 is a block diagram of a resource configuration apparatus according to yet another embodiment of the present disclosure.

Referring to FIG. 19, which shows a block diagram of a resource configuration apparatus according to an embodiment of the present disclosure. The apparatus has the function of implementing the above exemplary method at the network device. The function may be implemented by hardware, or by executing corresponding software by hardware. The apparatus may be the network device described above, or may be provided in the network device. As shown in FIG. 19, the apparatus 1900 may include a configuration information transmitting module 1910.

The configuration information transmitting module 1910 is configured to transmit first resource configuration information to a terminal device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In an example, the second-type resource configuration information may include at least one of: model usage information indicating an AI model used by the terminal device; model execution information indicating a part of the model that the terminal device is responsible for executing in the AI model used by the terminal device; model operation information indicating that a part of operation that the terminal device is responsible for executing in the AI model used by the terminal device; model download information indicating an AI model downloaded by the terminal device; data usage information indicating training data used by the terminal device when training the AI model; data reporting information indicating a frequency at which the terminal device reports a training result of the AI model; or resource usage information indicating an amount of resources used by the terminal device when performing an operation related to the AI model.

In an example, the model usage information may include: an identifier of the AI model used by the terminal device.

In an example, the model execution information may include: information on a model split point of the AI model used by the terminal device.

In an example, the model operation information may include: information on an operation split point of the AI model used by the terminal device.

In an example, the model download information may include: an identifier of the AI model downloaded by the terminal device.

In an example, the data usage information may include: an amount of training data used by the terminal device when training the AI model.

In an example, the data reporting information may include: a reporting period for the terminal device to report the training result of the AI model.

In one example, the resource usage information may include: computing power used by the terminal device when performing the operation related to the AI model.

In an example, the first-type resource configuration information may include at least one of: time domain resource information, frequency domain resource information, space domain resource information, or code domain resource information.

In an example, the first resource configuration information may be carried in Radio Resource Control (RRC) configuration information; or the first resource configuration information may be carried in system information.

Figure 20:
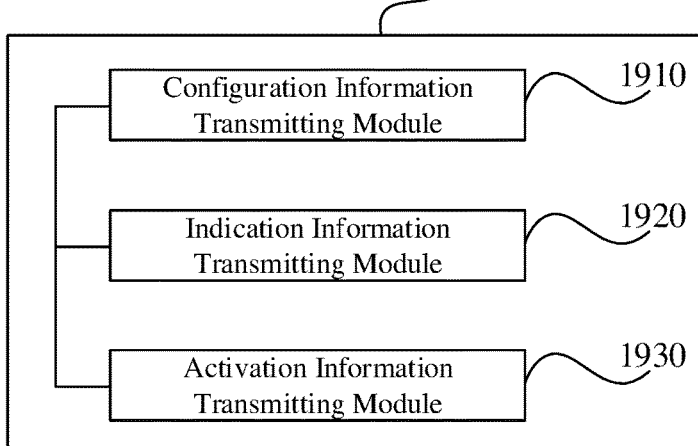
FIG. 20 is a block diagram of a resource configuration apparatus according to still another embodiment of the present disclosure.

In an example, as shown in FIG. 20, the apparatus 1900 may further include: an indication information transmitting module 1920 configured to transmit resource indication information to the terminal device, the resource indication information indicating a first resource configuration combination in the first resource configuration information, the first resource configuration combination matching device operation information of the terminal device.

In an example, the resource indication information may be carried in Downlink Control Information (DCI); or the resource indication information may be carried in a Medium Access Control (MAC) Control Element (CE).

In an example, the device operation information of the terminal device may include: a radio resource to be used by the terminal device and computing power to be used by the terminal device. The first resource configuration combination matching the device operation information of the terminal device may include: the first-type resource configuration information in the first resource configuration combination matching the radio resource to be used by the terminal device, and the second-type resource configuration information in the first resource configuration combination matching the computing power to be used by the terminal device.

In an example, as shown in FIG. 20, the apparatus 1900 may further include: an activation information transmitting module 1930 configured to transmit resource activation information to the terminal device, the resource activation information indicating m resource configuration combinations in the first resource configuration information, where m is a positive integer smaller than or equal to n.

In an example, the resource activation information may be carried in DCI; or the resource activation information may be carried in a MAC CE.

To summarize, with the technical solutions according to the embodiments of the present disclosure, the resource configuration information is transmitted to the terminal device by the network device. The resource configuration information includes multiple resource configuration combinations each including multiple types of resource configuration information, thereby providing a method for configuring multiple resource combinations. In addition, the embodiments of the present disclosure configure multiple types of resources in combination, such that the network device can schedule the multiple types of resources by performing one resource scheduling. When compared with the solution in which multiple times of resource scheduling are required for scheduling multiple types of resources separately, the solution of combined configuration according to the embodiments of the present disclosure can reduce the number of times the network device performs resource scheduling, reduce the processing overhead of the network device, and save data transmission resources.

In addition, in the embodiments of the present disclosure, each resource configuration combination may include two types of resource configuration information: one type of resource configuration information indicating the radio resource configuration, and the other type of resource configuration information indicating the AI resource configuration, so as to achieve combined configuration of the radio resource and the AI resource. When compared with a case where the radio resource and the AI resource are configured separately which may lead to the problem that the radio resource and the AI resource does not match each other, the embodiments of the present disclosure configure the radio resource and the AI resource that match each other together to form a resource configuration combination, which ensures both the adequacy of the radio resource and the quality of the AI service, thereby improving the utilization of the radio resource, and avoiding waste of radio resource or insufficient radio resource for data interaction when they are configured separately. It also improves the reliability of the AI service and avoids waste of the AI resource or insufficient AI resource for AI operations in the case of separate configurations.

It should be noted that, when the apparatus according to the above embodiment implements its functions, it is described with reference to the division of the above functional modules as an example for illustration only. In practical applications, the above functions can be allocated to different functional modules according to actual needs. That is, the content and structure of the apparatus can be divided into different functional modules to complete all or part of the functions described above.

Regarding the apparatus in the above embodiment, the specific manner in which each module performs its operation has been described in detail in the embodiments of the methods, and details thereof will be omitted here.

Figure 21:
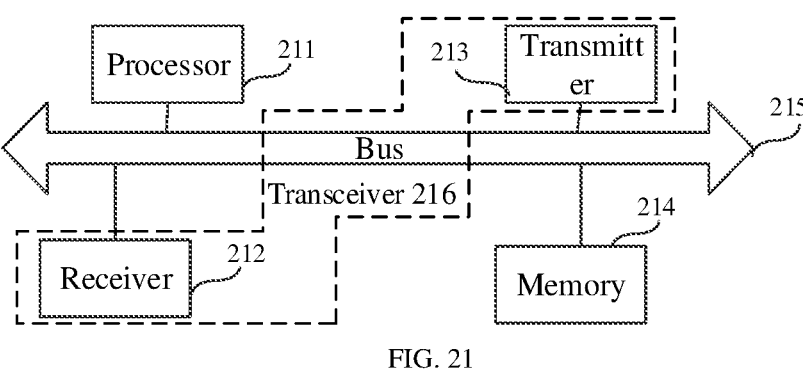
FIG. 21 is a block diagram showing a structure of a terminal device according to an embodiment of the present disclosure.

FIG. 21 is a schematic diagram showing a structure of a terminal device 210 according to an embodiment of the present disclosure. For example, the terminal device may be the above terminal device, and may be configured to perform the above resource configuration method at the terminal device. Specifically, the terminal device 210 may include: a processor 211, a receiver 212, a transmitter 213, a memory 214 and a bus 215.

The processor 211 includes one or more processing cores, and the processor 211 performs various functional applications and information processing by executing software programs and modules.

The receiver 212 and the transmitter 213 may be implemented as a transceiver 216, which may be a communication chip.

The memory 214 is connected to the processor 211 through the bus 215.

The memory 214 can store a computer program, and the processor 211 can be configured to execute the computer program, to implement various steps performed by the terminal device in the above method embodiments.

In addition, the memory 214 can be implemented by any type of volatile or non-volatile storage device or any combination thereof. The volatile or non-volatile storage device includes, but not limited to: Random-Access Memory (RAM), Read-Only Memory (ROM), Erasable Programmable Read-Only Memory (EPROM), Electrically Erasable Programmable Read-Only Memory (EEPROM), flash memory, or other solid state storage technology, Compact Disc Read-Only Memory (CD-ROM), Digital Video Disc (DVD) or other optical storage, cassette, magnetic tape, magnetic disk storage or other magnetic storage device.

The transceiver 216 is configured to receive first resource configuration information from a network device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In an example, the second-type resource configuration information may include at least one of: model usage information indicating an AI model used by the terminal device; model execution information indicating a part of the model that the terminal device is responsible for executing in the AI model used by the terminal device; model operation information indicating that a part of operation that the terminal device is responsible for executing in the AI model used by the terminal device; model download information indicating an AI model downloaded by the terminal device; data usage information indicating training data used by the terminal device when training the AI model; data reporting information indicating a frequency at which the terminal device reports a training result of the AI model; or resource usage information indicating an amount of resources used by the terminal device when performing an operation related to the AI model.

In an example, the model usage information may include: an identifier of the AI model used by the terminal device.

In an example, the model execution information may include: information on a model split point of the AI model used by the terminal device.

In an example, the model operation information may include: information on an operation split point of the AI model used by the terminal device.

In an example, the model download information may include: an identifier of the AI model downloaded by the terminal device.

In an example, the data usage information may include: an amount of training data used by the terminal device when training the AI model.

In an example, the data reporting information may include: a reporting period for the terminal device to report the training result of the AI model.

In one example, the resource usage information may include: computing power used by the terminal device when performing the operation related to the AI model.

In an example, the first-type resource configuration information may include at least one of: time domain resource information, frequency domain resource information, space domain resource information, or code domain resource information.

In an example, the first resource configuration information may be carried in Radio Resource Control (RRC) configuration information; or the first resource configuration information may be carried in system information.

In an example, the processor 211 may be configured to select a first resource configuration combination from the first resource configuration information, the first resource configuration combination matching device operation information of the terminal device.

In an example, the transceiver 216 may be configured to receive resource indication information from the network device, the resource indication information indicating a first resource configuration combination in the first resource configuration information, the first resource configuration combination matching device operation information of the terminal device. The processor 211 may be configured to select the first resource configuration combination based on the resource indication information.

In an example, the resource indication information may be carried in Downlink Control Information (DCI); or the resource indication information may be carried in a Medium Access Control (MAC) Control Element (CE).

In an example, the transceiver 216 is configured to receive resource activation information from the network device, the resource activation information indicating m resource configuration combinations in the first resource configuration information, where m is a positive integer smaller than or equal to n. The processor 211 may be configured to activate the m resource configuration combinations based on the resource activation information.

In an example, the processor 211 may be configured to select a first resource configuration combination from the m resource configuration combinations, the first resource configuration combination matching device operation information of the terminal device.

In an example, the resource activation information may be carried in DCI; or, the resource activation information may be carried in a MAC CE.

In an example, the device operation information of the terminal device may include: a radio resource to be used by the terminal device and computing power to be used by the terminal device. The first resource configuration combination matching the device operation information of the terminal device may include: the first-type resource configuration information in the first resource configuration combination matching the radio resource to be used by the terminal device, and the second-type resource configuration information in the first resource configuration combination matching the computing power to be used by the terminal device.

Figure 22:
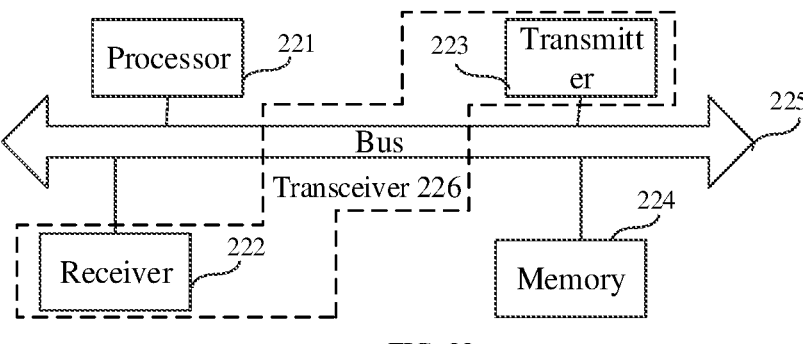
FIG. 22 is a block diagram showing a structure of a network device according to an embodiment of the present disclosure.

FIG. 22 is a schematic diagram showing a structure of a network device 220 according to an embodiment of the present disclosure. For example, the network device may be the network device described above, and may be configured to perform the resource configuration method at the network device. Specifically, the network device 220 may include: a processor 221, a receiver 222, a transmitter 223, a memory 224 and a bus 225.

The processor 221 includes one or more processing cores, and the processor 221 performs various functional applications and information processing by executing software programs and modules.

The receiver 222 and the transmitter 223 may be implemented as a transceiver 226, which may be a communication chip.

The memory 224 is connected to the processor 221 through the bus 225.

The memory 224 can store a computer program, and the processor 221 can be configured to execute the computer program, to implement each step performed by the network device in the above method embodiments.

In addition, the memory 224 can be implemented by any type of volatile or non-volatile storage device or any combination thereof. The volatile or non-volatile storage device includes, but not limited to: Random-Access Memory (RAM), Read-Only Memory (ROM), Erasable Programmable Read-Only Memory (EPROM), Electrically Erasable Programmable Read-Only Memory (EEPROM), flash memory, or other solid state storage technology, Compact Disc Read-Only Memory (CD-ROM), Digital Video Disc (DVD) or other optical storage, cassette, magnetic tape, magnetic disk storage or other magnetic storage device.

The transceiver 226 is configured to transmit first resource configuration information to a terminal device. The first resource configuration information includes n resource configuration combinations each including first-type resource configuration information and second-type resource configuration information, where n is positive integer. The first-type resource configuration information indicates a radio resource configuration, and the second-type resource configuration information indicates an Artificial Intelligence (AI) resource configuration.

In an example, the second-type resource configuration information may include at least one of: model usage information indicating an AI model used by the terminal device; model execution information indicating a part of the model that the terminal device is responsible for executing in the AI model used by the terminal device; model operation information indicating that a part of operation that the terminal device is responsible for executing in the AI model used by the terminal device; model download information indicating an AI model downloaded by the terminal device; data usage information indicating training data used by the terminal device when training the AI model; data reporting information indicating a frequency at which the terminal device reports a training result of the AI model; or resource usage information indicating an amount of resources used by the terminal device when performing an operation related to the AI model.

In an example, the model usage information may include: an identifier of the AI model used by the terminal device.

In an example, the model execution information may include: information on a model split point of the AI model used by the terminal device.

In an example, the model operation information may include: information on an operation split point of the AI model used by the terminal device.

In an example, the model download information may include: an identifier of the AI model downloaded by the terminal device.

In an example, the data usage information may include: an amount of training data used by the terminal device when training the AI model.

In an example, the data reporting information may include: a reporting period for the terminal device to report the training result of the AI model.

In one example, the resource usage information may include: computing power used by the terminal device when performing the operation related to the AI model.

In an example, the first-type resource configuration information may include at least one of: time domain resource information, frequency domain resource information, space domain resource information, or code domain resource information.

In an example, the first resource configuration information may be carried in Radio Resource Control (RRC) configuration information; or the first resource configuration information may be carried in system information.

In an example, the transceiver 226 may be further configured to transmit resource indication information to the terminal device, the resource indication information indicating a first resource configuration combination in the first resource configuration information, the first resource configuration combination matching device operation information of the terminal device.

In an example, the resource indication information may be carried in Downlink Control Information (DCI); or the resource indication information may be carried in a Medium Access Control (MAC) Control Element (CE).

In an example, the device operation information of the terminal device may include: a radio resource to be used by the terminal device and computing power to be used by the terminal device. The first resource configuration combination matching the device operation information of the terminal device may include: the first-type resource configuration information in the first resource configuration combination matching the radio resource to be used by the terminal device, and the second-type resource configuration information in the first resource configuration combination matching the computing power to be used by the terminal device.

In an example, the transceiver 226 may be further configured to transmit resource activation information to the terminal device, the resource activation information indicating m resource configuration combinations in the first resource configuration information, where m is a positive integer smaller than or equal to n.

In an example, the resource activation information may be carried in DCI; or the resource activation information may be carried in a MAC CE.

An embodiment of the present disclosure further provides a computer-readable storage medium. The computer-readable storage medium has a computer program stored therein. The computer program, when executed by a processor of a terminal device, implements the above resource configuration method at the terminal device.

An embodiment of the present disclosure further provides a computer-readable storage medium. The computer-readable storage medium has a computer program stored therein. The computer program, when executed by a processor of a network device, implements the above resource configuration method at the network device.

An embodiment of the present disclosure further provides a chip. The chip includes a programmable logic circuit and/or program instructions. The chip is configured to, when running on a terminal device, implement the above resource configuration method at the terminal device.

An embodiment of the present disclosure further provides a chip. The chip includes a programmable logic circuit and/or program instructions. The chip is configured to, when running on a network device, implement the above resource configuration method at the network device.

The present disclosure further provides a computer program product, which, when executed on a terminal device, causes a computer to perform the above resource configuration method at the terminal device.

The present disclosure further provides a computer program product, which, when executed on a network device, causes a computer to perform the above resource configuration method at the network device.

It can be appreciated by those skilled in the art that, in one or more of the above examples, the functions described in the embodiments of the present disclosure may be implemented by hardware, software, firmware, or any combination thereof. When implemented in software, the functions may be stored on or transmitted over a computer-readable medium as one or more instructions or codes. The computer-readable medium includes a computer storage medium and a communication medium that includes any medium capable of facilitating transfer of a computer program from one place to another. The storage medium can be any available medium that can be accessed by a general purpose or special purpose computer.

While the exemplary embodiments of the present disclosure have been described above, they are not intended to limit the present disclosure. Any modifications, equivalents, or improvements that can be made without departing from the spirit and principle of the present disclosure are to be encompassed by the scope of the present disclosure.

What is claimed is:

1. A resource configuration method, applied in a terminal device, the resource configuration method comprising:

receiving first resource configuration information from a network device, the first resource configuration information comprising n resource configuration combinations each comprising first-type resource configuration information and second-type resource configuration information, where n is a positive integer, wherein the first-type resource configuration information indicates a radio resource configuration, and the second-type resource configuration information indicates an Artificial Intelligence (AI) resource configuration;

wherein the resource configuration method further comprises:

selecting a first resource configuration combination from the first resource configuration information, the first resource configuration combination matching device operation information of the terminal device;

receiving resource indication information from the network device, the resource indication information indicating a first resource configuration combination in the first resource configuration information, the first resource configuration combination matching device operation information of the terminal device; and selecting the first resource configuration combination based on the resource indication information, wherein the resource indication information is carried in Downlink Control Information (DCI); or the resource indication information is carried in a Medium Access Control (MAC) Control Element (CE).

2. The resource configuration method according to claim 1, wherein the second-type resource configuration information comprises at least one of:

model usage information indicating an AI model used by the terminal device;

model execution information indicating a part of the model that the terminal device is responsible for executing in the AI model used by the terminal device;

model operation information indicating that a part of operation that the terminal device is responsible for executing in the AI model used by the terminal device;

model download information indicating an AI model downloaded by the terminal device;

data usage information indicating training data used by the terminal device when training the AI model;

data reporting information indicating a frequency at which the terminal device reports a training result of the AI model; or resource usage information indicating an amount of resources used by the terminal device when performing an operation related to the AI model.

3. The resource configuration method according to claim 2, wherein the model usage information comprises: an identifier of the AI model used by the terminal device;

wherein the model execution information comprises: information on a model split point of the AI model used by the terminal device;

wherein the model operation information comprises: information on an operation split point of the AI model used by the terminal device;

wherein the model download information comprises: an identifier of the AI model downloaded by the terminal device;

wherein the data usage information comprises: an amount of training data used by the terminal device when training the AI model;

wherein the data reporting information comprises: a reporting period for the terminal device to report the training result of the AI model; and wherein the resource usage information comprises: computing power used by the terminal device when performing the operation related to the AI model.

4. The resource configuration method according to claim 1, wherein the first-type resource configuration information comprises at least one of: time domain resource information, frequency domain resource information, space domain resource information, or code domain resource information; and wherein the first resource configuration information is carried in Radio Resource Control RRC) configuration information; or the first resource configuration information is carried in system information.

5. The resource configuration method according to claim 1, further comprising:

receiving resource activation information from the network device, the resource activation information indicating m resource configuration combinations in the first resource configuration information, where m is a positive integer smaller than or equal to n; and activating the m resource configuration combinations based on the resource activation information, wherein the resource configuration method further comprises, subsequent to activating the m resource configuration combinations based on the resource activation information:

selecting a first resource configuration combination from the m resource configuration combinations, the first resource configuration combination matching device operation information of the terminal device, wherein the resource activation information is carried in Downlink Control Information (DCI); or the resource activation information is carried in a Medium Access Control (MAC) Control Element (CE).

6. The resource configuration method according to claim 1, wherein the device operation information of the terminal device comprises: a radio resource to be used by the terminal device and computing power to be used by the terminal device, and the first resource configuration combination matching the device operation information of the terminal device comprises: the first-type resource configuration information in the first resource configuration combination matching the radio resource to be used by the terminal device, and the second-type resource configuration information in the first resource configuration combination matching the computing power to be used by the terminal device.

7. A terminal device, comprising:

a processor; and a transceiver connected to the processor and configured to receive first resource configuration information from a network device, the first resource configuration information comprising n resource configuration combinations each comprising first-type resource configuration information and second-type resource configuration information, where n is a positive integer, wherein the first-type resource configuration information indicates a radio resource configuration, and the second-type resource configuration information indicates an Artificial Intelligence (AI) resource configuration;

wherein the processor is configured to select a first resource configuration combination from the first resource configuration information, the first resource configuration combination matching device operation information of the terminal device;

the transceiver is configured to receive resource indication information from the network device, the resource indication information indicating a first resource configuration combination in the first resource configuration information, the first resource configuration combination matching device operation information of the terminal device; and the processor is configured to select the first resource configuration combination based on the resource indication information, wherein the resource indication information is carried in Downlink Control Information (DCI); or the resource indication information is carried in a Medium Access Control (MAC) Control Element (CE).

8. The terminal device according to claim 7, wherein the second-type resource configuration information comprises at least one of:

model usage information indicating an AI model used by the terminal device;

model execution information indicating a part of the model that the terminal device is responsible for executing in the AI model used by the terminal device;

model operation information indicating that a part of operation that the terminal device is responsible for executing in the AI model used by the terminal device;

model download information indicating an AI model downloaded by the terminal device;

data usage information indicating training data used by the terminal device when training the AI model;

data reporting information indicating a frequency at which the terminal device reports a training result of the AI model; or resource usage information indicating an amount of resources used by the terminal device when performing an operation related to the AI model.

9. The terminal device according to claim 8, wherein the model usage information comprises: an identifier of the AI model used by the terminal device;

wherein the model execution information comprises: information on a model split point of the AI model used by the terminal device;

wherein the model operation information comprises: information on an operation split point of the AI model used by the terminal device;

wherein the model download information comprises: an identifier of the AI model downloaded by the terminal device;

wherein the data usage information comprises: an amount of training data used by the terminal device when training the AI model;

wherein the data reporting information comprises: a reporting period for the terminal device to report the training result of the AI model; and wherein the resource usage information comprises: computing power used by the terminal device when performing the operation related to the AI model.

10. The terminal device according to claim 7, wherein the first-type resource configuration information comprises at least one of: time domain resource information, frequency domain resource information, space domain resource information, or code domain resource information; and wherein the first resource configuration information is carried in Radio Resource Control (RRC) configuration information; or the first resource configuration information is carried in system information.

11. The terminal device according to claim 7, wherein:

the transceiver is configured to receive resource activation information from the network device, the resource activation information indicating m resource configuration combinations in the first resource configuration information, where m is a positive integer smaller than or equal to n;

the processor is configured to activate the m resource configuration combinations based on the resource activation information;

the processor is further configured to select a first resource configuration combination from the m resource configuration combinations, the first resource configuration combination matching device operation information of the terminal device; and wherein the resource activation information is carried in Downlink Control Information (DCI); or the resource activation information is carried in a Medium Access Control (MAC) Control Element (CE).

12. The terminal device according to claim 7, wherein the device operation information of the terminal device comprises: a radio resource to be used by the terminal device and computing power to be used by the terminal device, and the first resource configuration combination matching the device operation information of the terminal device comprises: the first-type resource configuration information in the first resource configuration combination matching the radio resource to be used by the terminal device, and the second-type resource configuration information in the first resource configuration combination matching the computing power to be used by the terminal device.

13. A network device, comprising:

a processor; and a transceiver connected to the processor and configured to transmit first resource configuration information to a terminal device, the first resource configuration information comprising n resource configuration combinations each comprising first-type resource configuration information and second-type resource configuration information, where n is a positive integer, wherein the first-type resource configuration information indicates a radio resource configuration, and the second-type resource configuration information indicates an Artificial Intelligence (AI) resource configuration, to cause the terminal device to:

select a first resource configuration combination from the first resource configuration information, the first resource configuration combination matching device operation information of the terminal device;

the transceiver is configured to transmit resource indication information to the terminal device to cause the terminal device to select the first resource configuration combination based on the resource indication information, the resource indication information indicating a first resource configuration combination in the first resource configuration information, the first resource configuration combination matching device operation information of the terminal device, wherein the resource indication information is carried in Downlink Control Information (DCI); or the resource indication information is carried in a Medium Access Control (MAC) Control Element (CE).

14. The network device according to claim 13, wherein the second-type resource configuration information comprises at least one of:

model usage information indicating an AI model used by the terminal device;

model execution information indicating a part of the model that the terminal device is responsible for executing in the AI model used by the terminal device;

model operation information indicating that a part of operation that the terminal device is responsible for executing in the AI model used by the terminal device;

model download information indicating an AI model downloaded by the terminal device;

data usage information indicating training data used by the terminal device when training the AI model;

data reporting information indicating a frequency at which the terminal device reports a training result of the AI model; or resource usage information indicating an amount of resources used by the terminal device when performing an operation related to the AI model.

15. The network device according to claim 14, wherein the model usage information comprises: an identifier of the AI model used by the terminal device;

wherein the model execution information comprises: information on a model split point of the AI model used by the terminal device;

wherein the model operation information comprises: information on an operation split point of the AI model used by the terminal device;

wherein the model download information comprises: an identifier of the AI model downloaded by the terminal device;

wherein the data usage information comprises: an amount of training data used by the terminal device when training the AI model;

wherein the data reporting information comprises: a reporting period for the terminal device to report the training result of the AI model;

wherein the resource usage information comprises: computing power used by the terminal device when performing the operation related to the AI model.

16. The network device according to claim 13, wherein the first-type resource configuration information comprises at least one of: time domain resource information, frequency domain resource information, space domain resource information, or code domain resource information; and wherein the first resource configuration information is carried in Radio Resource Control (RRC) configuration information; or the first resource configuration information is carried in system information.

17. The network device according to claim 13, wherein:

the device operation information of the terminal device comprises: a radio resource to be used by the terminal device and computing power to be used by the terminal device, and the first resource configuration combination matching the device operation information of the terminal device comprises: the first-type resource configuration information in the first resource configuration combination matching the radio resource to be used by the terminal device, and the second-type resource configuration information in the first resource configuration combination matching the computing power to be used by the terminal device.

18. The network device according to claim 13, wherein:

the transceiver is configured to transmit resource activation information to the terminal device, the resource activation information indicating m resource configuration combinations in the first resource configuration information, where m is a positive integer smaller than or equal to n, wherein the resource activation information is carried in Downlink Control Information (DCI); or the resource activation information is carried in a Medium Access Control (MAC) Control Element (CE).

* * * * *